(12) United States Patent
Huang et al.

(10) Patent No.: US 9,681,457 B2
(45) Date of Patent: Jun. 13, 2017

(54) METHOD AND APPARATUS FOR COORDINATING INTER-CELL INTERFERENCE

(71) Applicant: Telefonaktiebolaget L M Ericsson (publ), Stockholm (SE)

(72) Inventors: Min Huang, Beijing (CN); Yang Tian, Beijing (CN); Lei Xiao, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 347 days.

(21) Appl. No.: 14/387,361

(22) PCT Filed: Apr. 14, 2014

(86) PCT No.: PCT/CN2014/075317
§ 371 (c)(1),
(2) Date: Sep. 23, 2014

(87) PCT Pub. No.: WO2015/157895
PCT Pub. Date: Oct. 22, 2015

(65) Prior Publication Data
US 2016/0286561 A1     Sep. 29, 2016

(51) Int. Cl.
*H04W 4/00* (2009.01)
*H04W 72/08* (2009.01)
(Continued)

(52) U.S. Cl.
CPC ............ *H04W 72/082* (2013.01); *H04L 1/00* (2013.01); *H04L 1/1822* (2013.01);
(Continued)

(58) Field of Classification Search
CPC ........... H04W 52/243; H04W 72/0426; H04W 72/082
(Continued)

(56) References Cited

U.S. PATENT DOCUMENTS

| 2010/0267408 A1 | 10/2010 | Lee et al. |
| 2011/0194527 A1* | 8/2011 | Lin ............. H04B 7/022 370/330 |

(Continued)

FOREIGN PATENT DOCUMENTS

| CN | 102026207 A | 4/2011 |
| EP | 2533595 A1 | 12/2012 |
| WO | 2015/157895 A1 | 10/2015 |

OTHER PUBLICATIONS

PCT Notification of Transmittal of the International Search Report and the Written Opinion of the International Searching Authority for PCT Counterpart Application No. PCT/CN2014/075317, mailed Jan. 21, 2015, 12 pages.

(Continued)

*Primary Examiner* — Charles Shedrick
(74) *Attorney, Agent, or Firm* — NDWE LLP

(57) ABSTRACT

Exemplary methods for coordinating inter-cell interference in a heterogeneous network comprising a macro cell and at least one small cell include obtaining, with regard to a terminal device in a small cell, a type of interference from the macro cell to the small cell, and determining a relationship between a number of uplink subframes and a number of downlink subframes in a current subframe configuration used in the macro cell. The methods also include allocating protected subframes for the terminal device according to the obtained type of interference and the determined relationship, and scheduling transmission in relation to the allocated protected subframes in the macro cell.

26 Claims, 11 Drawing Sheets

(a)

(b)

(51) Int. Cl.
*H04L 1/00* (2006.01)
*H04W 16/10* (2009.01)
*H04W 16/32* (2009.01)
*H04L 5/14* (2006.01)
*H04W 72/04* (2009.01)
*H04W 72/12* (2009.01)
*H04L 1/18* (2006.01)

(52) U.S. Cl.
CPC .......... *H04L 1/1887* (2013.01); *H04L 5/1415* (2013.01); *H04W 16/10* (2013.01); *H04W 16/32* (2013.01); *H04W 72/042* (2013.01); *H04W 72/0413* (2013.01); *H04W 72/0446* (2013.01); *H04W 72/1263* (2013.01)

(58) Field of Classification Search
USPC .................................................. 370/329, 294
See application file for complete search history.

(56) References Cited

U.S. PATENT DOCUMENTS

| | | | | |
|---|---|---|---|---|
| 2011/0255468 A1* | 10/2011 | Vajapeyam | ......... | H04W 72/082 370/328 |
| 2013/0258989 A1* | 10/2013 | Ribeiro | ................. | H04W 16/14 370/329 |
| 2013/0303152 A1* | 11/2013 | Kim | .................... | H04W 72/082 455/422.1 |
| 2014/0112262 A1* | 4/2014 | Mallik | .................. | H04L 5/0073 370/329 |
| 2016/0286561 A1* | 9/2016 | Huang | ...................... | H04L 1/00 |

OTHER PUBLICATIONS

3GPP TS 36.211 V12.1.0; "Evolved Universal Terrestrial Radio Access (E-UTRA); Physical channels and modulation", *3rd Generation Partnership Project; Technical Specification Group Radio Access Network*; http://www.3gpp.org/dynareport/36211.htm, (Mar. 2014), 120 pages.

3GPP TS 36.300; "Evolved Universal Terrestrial Radio Access (E-UTRA) and Evolved Universal Terrestrial Radio Access Network (E-UTRAN); Overall description; Stage 2", *3rd Generation Partnership Project; Technical Specification Group Radio Access Network*, http://www.3gpp.org/dynareport/36300.htm, (Mar. 2014), 209 pages.

3GPP TS 36.423 V12.1.0; "Evolved Universal Terrestrial Radio Access Network (E-UTRAN); X2 Application Protocol (X2AP)",*3rd Generation Partnership Project; Technical Specification Group Radio Access Network* (Release 12), http://www.3gpp.org/dynareport/36423.htm, (Mar. 2014), 144 pages.

3GPP TS 36.300, "3rd Generation Partnership Project; Technical Specification Group Radio Access Network; Evolved Universal Terrestrial Radio Access (E-UTRA) and Evolved Universal Terrestrial Radio Access Network (E-UTRAN); overall description; Stage 2 (Release 10)," (Dec. 2012), 194 pages, V10.9.0, 3GPP Organizational Partners.

3GPP TS 36.423, "3rd Generation Partnership Project; Technical Specification Group Radio Access Network; Evolved Universal Terrestrial Radio Access Network (E-UTRAN); X2 application protocol (X2AP) (Release 10)," (Mar. 2012), 132 pages, V10.5.0, 3GPP Organizational Partners.

International Preliminary Report on Patentability, Application No. PCT/CN2014/075317, dated Oct. 27, 2016, 6 pages.

* cited by examiner (a)

(b)

METHOD AND APPARATUS FOR COORDINATING INTER-CELL INTERFERENCE

CROSS-REFERENCE TO RELATED APPLICATIONS

This application is a National stage of International Application No. PCT/CN2014/075317, filed Apr. 14, 2014, which is hereby incorporated by reference.

TECHNICAL FIELD

The non-limiting and exemplary embodiments of the present disclosure generally relate to the technical field of radio communications, and specifically to a method and apparatus for coordinating inter-cell interference in a heterogeneous network comprising macro and small cells.

BACKGROUND

This section introduces aspects that may facilitate a better understanding of the disclosure. Accordingly, the statements of this section are to be read in this light and are not to be understood as admissions about what is in the prior art or what is not in the prior art.

Third Generation Partnership Project (3GPP) Long Term Evolution (LTE) networks are tailored for high-speed and high-throughput user groups. With a growing number of subscribers and increasing demand for bandwidth, traditional macro base stations can barely meet subscribers' requirements. Especially in some hotspots, simple macro cell coverage is not sufficient for meeting traffic requirements. Such homogenous coverage inevitably causes blind spots that may impact user experience.

With introduction of small cells, such as picocells or femtocells, and relay nodes, LTE network topology becomes more flexible and may handle blind spots. This network topology is defined as heterogeneous network (HetNet) in 3GPP Release 10. In a HetNet, low power nodes (LPNs), such as remote radio units/heads (RRUs/RRHs), pico eNodeBs, home eNodeBs, and relay nodes, which may form small cells, are deployed in a regular macro cell.

However, in such a HetNet, when a same carrier frequency is applied for the sake of spectrum efficiency, inter-cell interference between macro and small cells turns out to be severe and has different characteristics from a traditional homogenous network with macro cells only. Strong received power from the macro cell makes the small cell coverage narrow. This causes a limited cell splitting gain. Then Cell Range Expansion (CRE) is proposed, which allows a User Equipment (UE) to be served by a cell with weaker received power. CRE is simple and typical one of alternative cell associations to enhance offloading but it causes downlink (DL) interference issue in not only data but also control channels.

In particular, FIG. 1 explains different interference situations when CRE is applied or not applied in a HetNet. FIG. 1 (a) exemplarily illustrates an example HetNet that comprises a macro-cell base station BS1, e.g. a macro-eNodeB that forms a macro cell C1 and a small-cell base station BS2, e.g. a pico-eNodeB that forms a small cell C2, wherein CRE is not applied. UE1 is located close to the cell edge of the small cell C2 and outside the small cell C2, while UE2 is also located close to the cell edge of the small cell C2 but within the small cell C2. In this case, UE1 has a much longer distance away from BS1 than from BS2. Thus, UE1's uplink (UL) transmission, which is targeted to satisfy the reception sensitivity at BS1, forms strong interference to the small cell. This interference to the small cell is defined as UL interference. The interference from DL transmission in the macro cell to the small cell is defined as DL interference. In this situation as illustrated in FIG. 1(a), the UL interference from the macro cell causes a more serious impact on the small cell than the DL interference from the macro cell does. Therefore, this type of interference is defined as "UL-dominant interference" herein.

FIG. 1 (b) illustrates another example HetNet, which differs from the HetNet of FIG. 1(a) only in that CRE is applied. With the CRE, the small cell C2 of BS2 is expanded to be an expanded small cell C3. UE1 is located close to the cell edge of the expanded small cell C3 and outside the small cell C3, while UE2 is also located close to the cell edge of the small cell C3 but within the small cell C3. Due to the expansion of the small cell, the distance between UE1 and BS1 is reduced relative to the distance in FIG. 1(a). As a result, compared to the interference situation of FIG. 1(a), the UL interference caused by UE1 to the small cell is reduced. However, the DL interference from the macro-cell to UE2 is much stronger. In this case, the DL interference from the macro cell causes a more serious impact on the small cell than the UL interference from the macro cell does. Therefore, this type of interference is defined as "DL-dominant interference" herein.

With or without CRE application, the inter-cell interference situation in a HetNet turns out to be UL interference dominant or DL interference dominant. To handle such interference, protected subframes may be configured to form a timing pattern in the subframe configuration.

For example, to make UEs, e.g. UE2, in the small cell survive with the strong UL interference from the macro cell as illustrated in FIG. 1(a) without CRE being applied, a subset of UL subframes may be allocated as protected subframes for them. On these protected subframes, the UEs in the macro cell that are close to the cell edge of the small cell are restricted from being scheduled. Correspondingly, to make UEs, e.g. UE2, in the small cell survive with the strong DL interference as illustrated in FIG. 1(b) with CRE being applied, a kind of almost blank subframes (ABSs) is defined in 3GPP standard, wherein the power on some physical channels and/or some activity are reduced (including no transmission), which are described in reference documents [1] and [2]. The macro-cell base station may mute Physical Downlink Shared Channel (PDSCH) for data transmission on ABSs, only remains control channels. On these ABSs, the small-cell base station may schedule UEs that are located in the extended area of the extended small cell.

In prior-art, the evolved inter-cell interference coordination (eICIC) technique including an almost blank subframe (ABS) pattern and cell range extension (CRE) is proposed to coordinate inter-cell interference between a small-cell (like pico-cell, femto-cell) and its neighbor macro-cell in a LTE/LTE-Advanced (LTE-A) HetNet. Such ABS pattern configuration may be embodied as the allocation of protected subframes for the small-cell. However, how to allocate the protected subframes for both sides constitutes a primary issue in this technique. In a Frequency Division Duplex (FDD) system, the allocation of protected subframes may be arbitrary, because a DL subframe is one-to-one paired with a UL subframe with regard to the scheduling grant, data transmission, and ACK/NACK feedback.

However, in an LTE Time Division Duplex (TDD) HetNet system, TDD UL-DL configurations as defined in 3GPP TS 36.211 are used. In most of these UL-DL configurations, there are asymmetric numbers of DL and UL subframes, some of which are involved in DL or UL Hybrid Automatic Repeat Request (HARQ) processes, while others are not. If the protected subframes are allocated arbitrarily or unreasonably, there could be a risk of link failure in either macro cell or small cell.

REFERENCE DOCUMENTS

[1] 3GPP TS36.300, E-UTRAN Overall description
[2] 3GPP TS36.423, E-UTRAN X2AP Protocol specification

SUMMARY

Various embodiments of the disclosure aim at addressing at least part of the above problems and disadvantages. Other features and advantages of embodiments of the disclosure will also be understood from the following description of specific embodiments when read in conjunction with the accompanying drawings, which illustrate, by way of example, the principles of embodiments of the disclosure.

Various aspects of embodiments of the disclosure are set forth in the appended claims and summarized in this section.

In a first aspect of the disclosure, there is provided a method for coordinating inter-cell interference in a heterogeneous network comprising a macro cell and at least one small cell. The method comprises obtaining, with regard to a terminal device in a small cell, a type of interference from the macro cell to the small cell and determining a relationship between a number of uplink subframes and a number of downlink subframes in a current subframe configuration used in the macro cell. The method also comprises allocating protected subframes for the terminal device according to the obtained type of interference and the determined relationship. The method further comprises scheduling transmission in relation to the allocated protected subframes in the macro cell.

In one embodiment, the type of interference may comprise one of the following: uplink-dominant interference in which an impact of uplink interference from the macro cell on the small cell is more serious than an impact of downlink interference from the macro cell on the small cell; downlink-dominant interference in which the impact of the downlink interference on the small cell is more serious than the impact of the uplink interference on the small cell; and bidirectional interference in which the impact of the uplink interference on the small cell is equivalent to the impact of the downlink interference on the small cell.

In another embodiment, said allocating protected subframes for the terminal device may comprise: in response to the obtained type of interference being the uplink-dominant interference and the determined relationship indicating that the number of uplink subframes is larger than the number of downlink subframes, determining a subset of downlink Hybrid Automatic Repeat Request HARQ processes in the current subframe configuration and allocating uplink subframes in the determined subset as the protected subframes for the terminal device; in response to the obtained type of interference being the downlink-dominant interference and the determined relationship indicating that the number of uplink subframes is smaller than the number of downlink subframes, determining a subset of uplink HARQ processes in the current subframe configuration and allocating downlink subframes in the determined subset as the protected subframes for the terminal device; or in response to the obtained type of interference being the bidirectional interference, and (1) if the determined relationship indicates that the number of uplink subframes is larger than the number of downlink subframes, then determining a subset of the downlink HARQ processes and allocating all subframes in the determined subset as the protected subframes for the terminal device, and (2) if the determined relationship indicates that the number of uplink subframes is smaller than the number of downlink subframes, then determining a subset of the uplink HARQ processes and allocating all subframes in the determined subset as the protected subframes for the terminal device.

In yet another embodiment, said allocating protected subframes for the terminal device may comprise: in response to the obtained type of interference being the uplink-dominant interference and the determined relationship indicating that the number of uplink subframes is larger than the number of downlink subframes, determining a subset of downlink HARQ processes in the current subframe configuration and allocating the uplink subframes in the determined subset together with one or more of the uplink subframes not belonging to any downlink HARQ process as the protected subframes for the terminal device; in response to the obtained type of interference being the downlink-dominant interference and the determined relationship indicates that the number of uplink subframes is smaller than the number of downlink subframes, determining a subset of uplink HARQ processes in the current subframe configuration and allocating the downlink subframes in the determined subset together with one or more of the downlink subframes not belonging to any uplink HARQ process as the protected subframes for the terminal device; or in response to the obtained type of interference being the bidirectional interference, and (1) if the determined relationship indicates that the number of uplink subframes is larger than the number of downlink subframes, then determining a subset of the downlink HARQ processes and allocating all subframes in the determined subset together with one or more of the uplink subframes not belonging to any downlink HARQ process as the protected subframes for the terminal device, and (2) if the determined relationship indicates that the number of uplink subframes is smaller than the number of downlink subframes, then determining a subset of the uplink HARQ processes and allocating all subframes in the determined subset together with one or more of the downlink subframes not belonging to any uplink HARQ process as the protected subframes for the terminal device.

In yet another embodiment, determining the relationship between the number of uplink subframes and the number of downlink may be based on predefined Time Division Duplex uplink-downlink configuration information.

In a second aspect of the disclosure, there is provided a method in a terminal device for coordinating inter-cell interference in a heterogeneous network comprising a macro cell and at least one small cell. The method comprises receiving scheduling information in relation to protected subframe allocation from a base station serving the terminal device; and in response to the scheduling information indicating transmission scheduling on each of allocated protected subframes, conducting transmission on that allocated protected subframe. The protected subframe allocation is performed according to a type of interference from the macro cell to the small cell and a relationship between a number of uplink subframes and a number of downlink subframes in a current subframe configuration used in the macro cell.

In one embodiment, the type of interference may comprise one of the following: uplink-dominant interference in which an impact of uplink interference from the macro cell on the small cell is more serious than an impact of downlink interference from the macro cell on the small cell; downlink-dominant interference in which the impact of the downlink interference on the small cell is more serious than the impact of the uplink interference on the small cell; and bidirectional interference in which the impact of the uplink interference on the small cell is equivalent to the impact of the downlink interference on the small cell.

In another embodiment, said allocated protected subframes may comprise: uplink subframes in a subset of downlink Hybrid Automatic Repeat Request HARQ processes in the current subframe configuration, in a case where the type of interference is the uplink-dominant interference and the relationship indicates that the number of uplink subframes is larger than the number of downlink subframes; downlink subframes in a subset of uplink HARQ processes in the current subframe configuration, in a case where the type of interference is the downlink-dominant interference and the relationship indicates that the number of uplink subframes is smaller than the number of downlink subframes; all subframes in a subset of the downlink HARQ processes, in a case where the type of interference is the bidirectional interference and the relationship indicates that the number of uplink subframes is larger than the number of downlink subframes; or all subframes in a subset of the uplink HARQ processes, in a case where the type of interference is the bidirectional interference and the relationship indicates that the number of uplink subframes is smaller than the number of downlink subframes.

In yet another embodiment, said protected subframes may comprise: uplink subframes in a subset of downlink Hybrid Automatic Repeat Request HARQ processes in the current subframe configuration and one or more of the uplink subframes not belonging to any downlink HARQ process, in a case where the type of interference is the uplink-dominant interference and the relationship indicates that the number of uplink subframes is larger than the number of downlink subframes; downlink subframes in a subset of uplink HARQ processes in the current subframe configuration and one or more of the downlink subframes not belonging to any uplink HARQ process, in a case where the type of interference is the downlink-dominant interference and the relationship indicates that the number of uplink subframes is smaller than the number of downlink subframes; all subframes in a subset of the downlink HARQ processes and one or more of the uplink subframes not belonging to any downlink HARQ process, in a case where the type of interference is the bidirectional interference and the relationship indicates that the number of uplink subframes is larger than the number of downlink subframes; or all subframes in a subset of the uplink HARQ processes and one or more of the downlink subframes not belonging to any uplink HARQ process, in a case where the type of interference is the bidirectional interference and the relationship indicates that the number of uplink subframes is smaller than the number of downlink subframes.

In yet another embodiment, the relationship between the number of uplink subframes and the number of downlink may be based on predefined Time Division Duplex uplink-downlink configuration information.

In a third aspect of the disclosure, there is provided an apparatus adapted for coordinating inter-cell interference in a heterogeneous network comprising a macro cell and at least one small cell. The apparatus comprises an obtaining module configured to obtain, with regard to a terminal device in a small cell, a type of interference from the macro cell to the small cell; and a determining module configured to determine a relationship between a number of uplink subframes and a number of downlink subframes in a current subframe configuration used in the macro cell. The apparatus also comprises an allocating module configured to allocate protected subframes for the terminal device according to the obtained type of interference and the determined relationship. The apparatus further comprises a scheduling module configured to schedule transmission in relation to the allocated protected subframes in the macro cell.

In a fourth aspect of the disclosure, there is provided a terminal device adapted for coordinating inter-cell interference in a heterogeneous network comprising a macro cell and at least one small cell. The terminal device comprises a receiving module configured to receive scheduling information in relation to protected subframe allocation from a base station serving the terminal device and to, in response to the scheduling information indicating downlink transmission scheduling on one or more of allocated subframes, conduct downlink reception on the one or more of the allocated protected subframes. The terminal device also comprises a transmitting module configured to, in response to the scheduling information indicating uplink transmission scheduling on one or more of the allocated subframes, conduct uplink transmission on the one or more of the allocated protected subframes. The protected subframe allocation is performed according to a type of interference from the macro cell to the small cell and a relationship between a number of uplink subframes and a number of downlink subframes in a current subframe configuration used in the macro cell.

In a fifth aspect of the disclosure, there is provided a terminal device adapted for coordinating inter-cell interference in a heterogeneous network comprising a macro cell and at least one small cell, wherein TDD uplink-downlink configuration 0 is used. The terminal device comprises a receiving module configured to receive scheduling information in relation to protected subframe allocation from a base station serving the terminal device and to, in response to the scheduling information indicating downlink transmission scheduling on one or more of allocated protected subframes, conduct downlink reception on the one or more of the allocated protected subframes. The terminal device also comprises a transmitting module configured to, in response to the scheduling information indicating uplink transmission scheduling on one or more of the allocated protected subframes, conduct uplink transmission on the one or more of the allocated protected subframes. The allocated protected subframes comprise: uplink subframes in a subset of four downlink HARQ processes in the TDD uplink-downlink configuration 0; uplink subframes in a subset of the four downlink HARQ processes and one or more uplink subframes not belonging to any of the four downlink HARQ processes; all subframes in a subset of the four downlink HARQ processes; or all subframes in a subset of the four downlink HARQ processes and one or more uplink subframes not belonging to any of the four downlink HARQ processes.

In a sixth aspect of the disclosure, there is provided a terminal device adapted for coordinating inter-cell interference in a heterogeneous network comprising a macro cell and at least one small cell, wherein TDD uplink-downlink configuration 1 is used. The terminal device comprises a receiving module configured to receive scheduling information in relation to protected subframe allocation from a base station serving the terminal device and to, in response to the scheduling information indicating downlink transmission scheduling on one or more of allocated protected subframes, conduct downlink reception on the one or more of the allocated protected subframes. The terminal device also comprises a transmitting module configured to, in response to the scheduling information indicating uplink transmission scheduling on one or more of the allocated protected subframes, conduct uplink transmission on the one or more of the allocated downlink protected subframes. The allocated protected subframes comprise: downlink subframes in a subset of four uplink HARQ processes in the TDD uplink-downlink configuration 1; downlink subframes in a subset of the four uplink HARQ processes and one or more downlink subframes not belonging to any of the four uplink HARQ processes; all subframes in a subset of the four uplink HARQ processes; or all subframes in a subset of the four uplink HARQ processes and one or more downlink subframes not belonging to any of the four uplink HARQ processes.

In a seventh aspect of the disclosure, there is provided a terminal device adapted for coordinating inter-cell interference in a heterogeneous network comprising a macro cell and at least one small cell, wherein TDD uplink-downlink configuration 2 is used. The terminal device comprises a receiving module configured to receive scheduling information in relation to protected subframe allocation from a base station serving the terminal device and to, in response to the scheduling information indicating downlink transmission scheduling on one or more of allocated protected subframes, conduct downlink reception on the one or more of the allocated protected subframes. The terminal device also comprises a transmitting module configured to, in response to the scheduling information indicating uplink transmission scheduling on one or more of the allocated protected subframes, conduct uplink transmission on the one or more of the allocated downlink protected subframes. The allocated protected subframes comprise: downlink subframes in either of two uplink HARQ processes in the TDD uplink-downlink configuration 2; downlink subframes in either of the two uplink HARQ processes and one or more downlink subframes not belonging to any of the two uplink HARQ processes; all subframes in either of the two uplink HARQ processes; or all subframes in either of the two uplink HARQ processes and one or more downlink subframes not belonging to any of the two uplink HARQ processes.

In an eighth aspect of the disclosure, there is provided an apparatus adapted for coordinating inter-cell interference in a heterogeneous network comprising a macro cell and at least one small cell. The apparatus comprises a processor and a memory. The memory contains instructions executable by the processor whereby the apparatus is operative to obtain, with regard to a terminal device in a small cell, a type of interference from the macro cell to the small cell and determine a relationship between a number of uplink subframes and a number of downlink subframes in a current subframe configuration used in the macro cell. The memory further contains instructions executable by the processor whereby the apparatus is operative to allocate protected subframes for the terminal device according to the obtained type of interference and the determined relationship; and to schedule transmission in relation to the allocated protected subframes in the macro cell.

In a ninth aspect of the disclosure, there is provided a terminal device adapted for coordinating inter-cell interference in a heterogeneous network comprising a macro cell and at least one small cell. The terminal device comprises a processor and a memory. The memory contains instructions executable by said processor whereby said terminal device is operative to receive scheduling information in relation to protected subframe allocation from a base station serving the terminal device; and in response to the scheduling information indicating transmission scheduling on each of allocated protected subframes, to conduct transmission on that allocated protected subframe. The protected subframe allocation is performed according to a type of interference from the macro cell to the small cell and a relationship between a number of uplink subframes and a number of downlink subframes in a current subframe configuration used in the macro cell.

In a tenth aspect of the disclosure, there is provided an apparatus adapted for coordinating inter-cell interference in a heterogeneous network comprising a macro cell and at least one small cell. The apparatus comprises processing means. The processing means is adapted to obtain, with regard to a terminal device in a small cell, a type of interference from the macro cell to the small cell and to determine a relationship between a number of uplink subframes and a number of downlink subframes in a current subframe configuration used in the macro cell. The processing means is further adapted to allocate protected subframes for the terminal device according to the obtained type of interference and the determined relationship and to schedule transmission in relation to the allocated protected subframes in the macro cell.

In an eleventh aspect of the disclosure, there is provided a terminal device adapted for coordinating inter-cell interference in a heterogeneous network comprising a macro cell and at least one small cell. The terminal device comprises processing means. The processing means is adapted to receive scheduling information in relation to protected subframe allocation from a base station serving the terminal device; and in response to the scheduling information indicating transmission scheduling on each of allocated protected subframes, to conduct transmission on that allocated protected subframe. The protected subframe allocation is performed according to a type of interference from the macro cell to the small cell and a relationship between a number of uplink subframes and a number of downlink subframes in a current subframe configuration used in the macro cell.

In a twelfth aspect of the disclosure, there is provided a computer program, comprising instructions which, when executed on at least one processor, cause the at least one processor to carry out the method according to the first aspect of the disclosure.

In a thirteenth aspect of the disclosure, there is provided a computer program, comprising instructions which, when executed on at least one processor, cause the at least one processor to carry out the method according to the second aspect of the disclosure.

According to the various aspects and embodiments as mentioned above, protected subframes are allocated according to the type of interference and the relationship between the number of uplink subframes and the number downlink subframes, so that a terminal device in a small cell of a HetNet, especially of a TDD HetNet, could be scheduled to conduct normal UL data transmission and/or DL data reception on the allocated protected subframes without interference or with acceptable interference.

BRIEF DESCRIPTION OF THE DRAWINGS

The above and other aspects, features, and benefits of various embodiments of the disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

Figure 1:
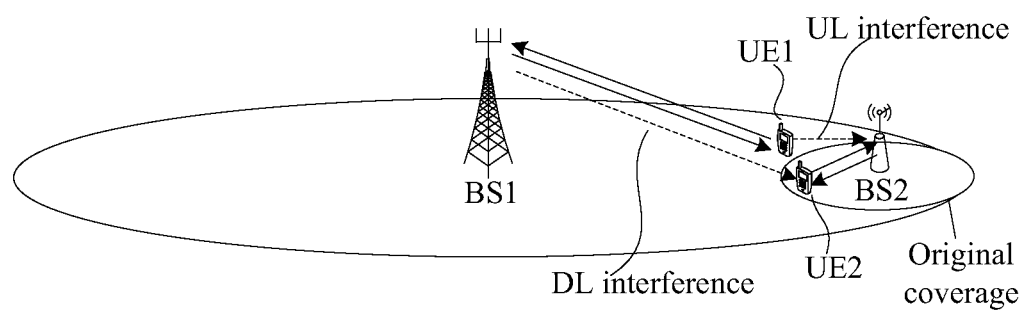
FIG. 1 explains different interference situations when CRE is applied or not applied in a HetNet.
Figure 1:
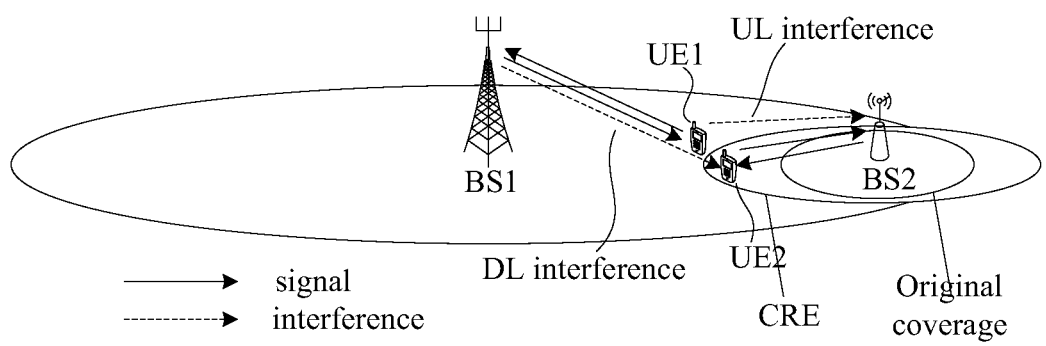

Hereinafter, the principle and spirit of the present disclosure will be described with reference to the illustrative embodiments. It should be understood, all these embodiments are given merely for the skilled in the art to better understand and further practice the present disclosure, but not for limiting the scope of the present disclosure. For example, features illustrated or described as part of one embodiment may be used with another embodiment to yield still a further embodiment. In the interest of clarity, not all features of an actual implementation are described in this specification.

References in the specification to "one embodiment", "an embodiment", "an example embodiment" etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is associated with the knowledge of one skilled in the art to affect such feature, structure, or characteristic in connection with other embodiments whether or not explicitly described.

It shall be understood that, although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skill in the art to which this disclosure belongs. For example, the term terminal device used herein may refer to any terminal having wireless communication capabilities or user equipment (UE), including but not limited to, mobile phone, cellular phones, smart phone, or personal digital assistants (PDAs), portable computers, image capture device such as digital cameras, gaming devices, music storage and playback appliances and any portable units or terminals that have wireless communication capabilities, or Internet appliances permitting wireless Internet access and browsing and the like. Likewise, the term base station used herein may be referred to as e.g. eNB, eNodeB, NodeB, Base Transceiver Station BTS or Access Point (AP), depending on the technology and terminology used.

The following description of various embodiments aims to illustrate the principle and concept of the present disclosure. Therefore, other inter-cell interference coordination technologies, such as beamforming technology, will not be considered in this disclosure. For illustrative purposes, several embodiments of the present invention will be described in the context of a LTE TDD system. Those skilled in the art will appreciate, however, that several embodiments of the present invention may be more generally applicable to other TDD systems. In this specification, the term "subframes" used herein is intended to include the singular form as well, i.e. it may refer to one or more subframes, unless the context clearly indicates otherwise.

In order to clearly describe embodiments of the present disclosure, subframe configurations currently used for a LTE TDD frame structure are firstly introduced. The subframe configuration indicates how all subframes are allocated to DL and UL.

In a LTE TDD system, each radio frame consists of two half-frames. Each half-frame consists of five subframes. The supported subframe configurations in the LTE TDD system are specified as UL-DL configurations in table 4.2-2 of 3GPP TS 36.211, which is re-presented herein in Table 1, wherein for each subframe in a radio frame, "D" denotes the subframe reserved for DL transmission, "U" denotes the subframe reserved for UL transmission and "S" denotes a special subframe, which may be used for DL transmission. The positions and numbers of DL subframes, special subframes, and UL subframes are different from each other per UL-DL configuration. A time at which DL is changed to UL or a time at which UL is changed to DL is referred to as a switch-point. Switch-point periodicity denotes a period in which switching between a UL subframe and a DL subframe is equally repeated. The switch-point periodicity supports each of 5 ms and 10 ms.

The above-mentioned UL-DL configuration is considered to be system information well known to all BSs and UEs. The BS is configured to transmit only an index of configuration information whenever the UL-DL configuration information is changed, so that the change of a UL-DL allocation state of a radio frame may be recognized by the UE. In addition, configuration information is a kind of DL control information, and may be transmitted through a Physical Downlink Control Channel (PDCCH) serving as a DL control channel in the same manner as in other scheduling information. The configuration information serving as broadcast information may be commonly transmitted to all UEs contained in a cell through a broadcast channel. Meanwhile, HARQ ACK/NACK transmitted to the UE over a Physical HARQ Indicator Channel (PHICH) at an i-th subframe in a FDD system is associated with a Physical Uplink Shared Channel (PUSCH) transmitted at an (i−4)-th subframe by the UE. On the other hand, a DL/UL frame structure of the TDD system is different per a UL-DL configuration, so that a PUSCH and PHICH transmission time is different per configuration and the PUSCH and PHICH transmission time may be differently constructed according to an index (or number) of a subframe. In the LTE system, UL/DL timing relationship among a PUSCH, a PDCCH preceding the PUSCH, and a PHICH for transmission of DL HARQ ACK/NACK corresponding to the PUSCH is predetermined.

TABLE 1

UL-DL configurations

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In table 1, there are seven UL-DL configurations. If the special subframes are regarded as DL subframes, UL-DL configuration 0 comprises more UL subframes than DL subframes; UL-DL configurations 1-5 comprise more DL subframes than UL subframes; and UL-DL configuration 6 comprises equal DL and UL subframes.

Each of the UL-DL configurations may comprise a plurality of DL HARQ processes, the number of which may equal to the number of DL subframes or a plurality of UL HARQ processes, the number of which may equal to the number of UL subframes. Each HARQ process comprises a pair of DL and UL subframes. The "DL HARQ process" means that the UL subframe comprised therein may be used to transmit an ACK/NACK feedback for DL data transmission on the paired DL subframe, while the "UL HARQ process" means that the DL subframe comprised therein may be used to transmit a scheduling grant and/or ACK/NACK feedback for UL data transmission on the paired UL subframe etc.

In a HetNet using a subframe configuration that comprises more UL subframes than DL subframes, for example, if UL-DL configuration 0 is used, then for each DL transmission, a UL subframe can always be found to pair with it to transmit the ACK/NACK feedback and/or CSI. Therefore, in such a HetNet, if the impact of DL interference from the macro cell is dominant on the small cell, protected subframes used for alleviating the impact of the DL-dominant interference may be arbitrarily allocated; however, if the impact of UL interference from the macro cell is dominant on the small cell or the impacts of the UL and DL interference are equivalent on the small cell (this type of interference will be referred to as bidirectional interference hereafter), the protected subframes may not be arbitrarily allocated.

Similarly, in a HetNet using a subframe configuration that comprises more DL subframes than UL subframes, for example, if UL-DL configuration 1 or 2 is used, then for each UL transmission, a DL subframe can always be found to pair with it to transmit the ACK/NACK feedback and/or scheduling grant. Therefore, in such a HetNet, if the impact of UL interference from the macro cell is dominant on the small cell, protected subframes used for alleviating the impact of the UL-dominant interference may be arbitrarily allocated; however, if the impact of DL interference from the macro cell is dominant on the small cell or the impacts of the UL and DL interference are equivalent on the small cell, the protected subframes may not be arbitrarily allocated.

As for subframe configurations with equal numbers of UL and DL subframes, protected subframes may also be arbitrarily allocated, because a DL subframe may be one-to-one paired with a UL subframe with regard to the scheduling grant, data transmission, and ACK/NACK feedback.

Therefore, embodiments of the present disclosure will be focused on four cases: (I) where the interference type is UL-dominant interference and the current subframe configuration used in the macro cell comprises more UL subframes than DL subframes; (II) where the interference type is DL-dominant interference and the current subframe configuration used in the macro cell comprises more DL subframes than UL subframes; (III) where the interference type is bidirectional interference and the current subframe configuration used in the macro cell comprises more UL subframes than DL subframes; and (IV) where the interference type is bidirectional interference and the current subframe configuration used in the macro cell comprises more DL subframes than UL subframes.

With reference to FIGS. 2-6, specific methods for coordinating inter-cell interference in a HetNet according to embodiments of the present disclosure for use in the above mentioned four cases (I)-(IV) will be exemplified in association with TDD UL-DL configuration 0, 1, and 2 as defined in the 3GPP standard. In the following descriptions, the network as illustrated in FIG. 1(a) or (b) which comprises a macro cell formed by BS1 and a small cell formed by BS2 is used as an example of the HetNet and UEs, including UE and UE2 as illustrated in FIG. 1(a) or (b), are used as an example of terminal devices. However, those skilled in the art shall appreciate that FIG. 1(a) or (b) is only illustrative rather than limiting the scope of the disclosure, and more macro cells may be formed in a HetNet and each of the macro cells may comprise more than one small cells. Those skilled in the art shall also appreciate that although the embodiments of the present disclosure are described based on these four cases, the principle and concept of the present disclosure may be generally applicable to other cases.

Case (I)

Figure 2:
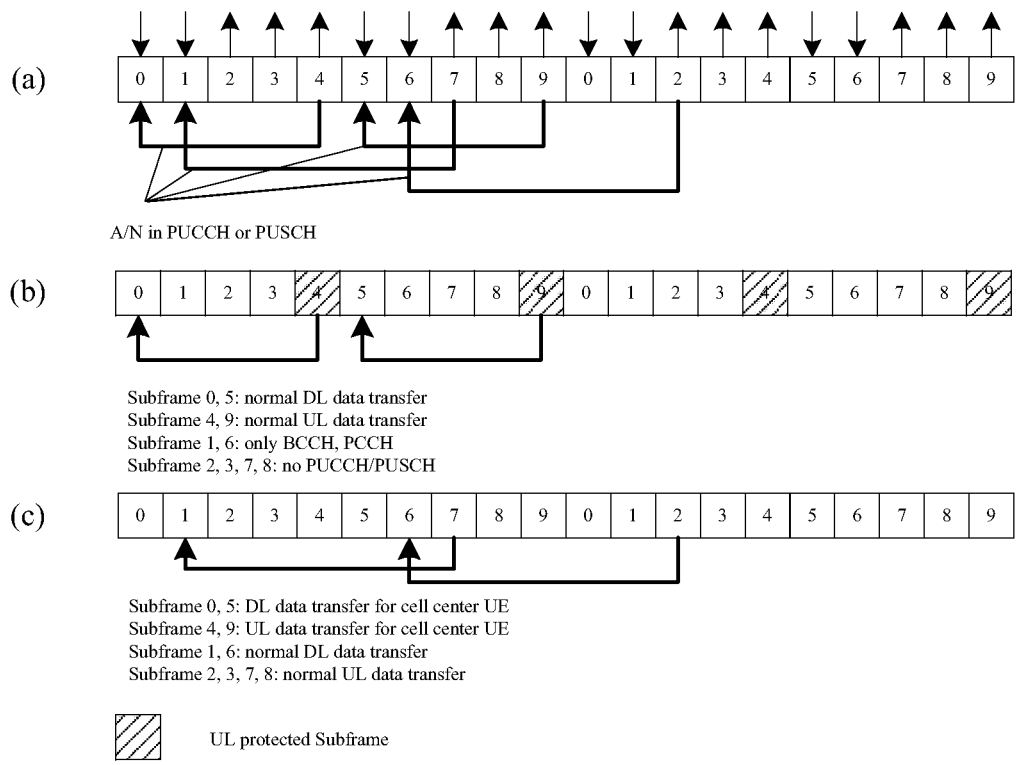
FIG. 2 illustrates a specific method for coordinating inter-cell interference in Case (I) according to an embodiment of the present disclosure.

A specific method for coordinating inter-cell interference in Case (I) according to an embodiment of the present disclosure will be described with reference to an example of FIG. 2, in which UL-DL configuration 0 is used as an example of the current subframe configuration used in the macro cell that comprises six UL subframes and four DL subframes. In this case, DL HARQ processes will be considered.

Reference is now made to FIG. 2(a), in which a frame structure based on UL-DL configuration 0 is illustrated. As illustrated, a block with an upward arrow represents an UL subframe and a block with a downward arrow represents a DL subframe. FIG. 2(a) illustrates two frames, each of them comprising ten subframes 0-9. With this subframe configuration, four DL HARQ processes may be formed. In particular, DL subframe 0 is paired with UL subframe 4 to form a first DL HARQ process; DL subframe 1 is paired with subframe 7 to form a second DL HARQ process; DL subframe 5 is paired with UL subframe 9 to form a third DL HARQ process; and DL subframe 6 is paired with UL subframe 2 to form a fourth DL HARQ process. Each of the DL HARQ processes includes a DL subframe on which data may be transmitted in a PDSCH and the paired UL subframe on which an ACK/NACK feedback to the data transmission on the DL subframe and/or CSI may be transmitted in a Physical Uplink Control Channel (PUCCH) or PUSCH.

In this embodiment, the type of interference from the macro cell to the small cell is the UL-dominant interference, which corresponds to the situation illustrated in FIG. 1(a), and the current subframe configuration comprises more UL subframes than DL subframes. Therefore, in order to reduce the impact of the UL-dominant interference, UL protected subframes will be allocated for the small cell, e.g. with regard to UE2 as illustrated in FIG. 1(a).

Firstly, a subset of the DL HARQ processes is determined. In the example as illustrated in FIG. 2, the subset of DL HARQ processes is determined as comprising the first DL HARQ process and the third DL HARQ process. Then, the UL subframes in the determined subset are allocated as the UL protected subframes for the small cell. For example, as illustrated in FIG. 2(b), UL subframes 4 and 9 may be allocated as the UL protected subframes for the small-cell. The determined "subset" restricts the protected subframe allocation from allocating all UL subframes associated with the DL HARQ processes as the protected subframes, which extreme case may lead to a lack of effective resources for DL data transmission in the macro cell and thus lead to a link failure in the macro cell.

These protected subframes may be utilized in various ways, either following 3GPP standard or using proprietary implementations. On small-cell side, as illustrated in FIG. 2(b), the small-cell base station, e.g. BS2 as illustrated in FIG. 1(a), may schedule all UEs within the small cell to perform normal UL data transmission on the protected subframes 4 and 9. The "normal UL data transmission" used herein may include both PUCCH and PUSCH transmission with normal transmit power. Correspondingly, the small-cell base station may schedule normal DL data transmission for all UEs within the small cell on DL subframes 0 and 5 paired with the UL protected subframes 4 and 9. The "normal DL data transmission" used herein may include both PDCCH and PDSCH transmission with normal transmit power. As for other UL subframes 2, 3, 7 and 8 than the UL protected subframes 4 and 9, the small-cell base station may not schedule any normal UL data transmission on them. As for other DL subframes 1 and 6 which are not comprised in the determined subset, only some control channels, such as Broadcast Control Channel (BCCH) and Physical Control Channel (PCCH) may be transmitted on them.

On macro-cell side, as illustrated in FIG. 2(c), the macro-cell base station, e.g. BS1 as illustrated in FIG. 1(a), may schedule the normal UL data transmission for UEs located in the center of the macro cell (which will be referred to as "macro cell-center UEs" hereafter) rather than UEs located at the edge of the macro cell (which will be referred to as "macro cell-edge UEs") on the UL protected subframes 4 and 9 allocated for the small cell. The "macro cell-center UEs" refer to UEs in the macro cell whose UL interference to the small cell need not to be considered in the embodiment of the present disclosure. By contrast, the "macro cell-edge UEs" refer to UEs which are located close to the edge of the small cell but outside the small cell and whose UL interference has a more serious impact on the small cell than DL interference, e.g. UE1 as illustrated in FIG. 1(a). Correspondingly, the macro-cell base station may schedule the normal DL data transmission for the macro cell-center UEs only on DL subframes 0 and 5 paired with the UL protected subframes 4 and 9. As for other UL subframes 2, 3, 7 and 8 than the UL protected subframes 4 and 9, the macro-cell base station may schedule the normal UL data transmission on them. As for other DL subframes 1 and 6 which are not included in the determined subset, the macro cell base station may schedule normal DL data transmission on them.

By this way, the UL interference from the macro cell to the small-cell may be alleviated.

According to the embodiment of the present disclosure, the protected subframes are allocated from the DL HARQ processes. Otherwise, if the UL subframes which are not included in any DL HARQ process alone, e.g. UL subframes 3 and 8, are allocated as the UL protected subframes for UEs in the small cell, then although UL data transmission of UEs in the small cell are possible, DL data transmission for the UEs may fail, because the ACK/NACK to the DL data transmission has to be transmitted in the PUCCH or PUSCH associated with a DL HARQ process, which would suffer from strong interference from the macro cell. Although the UL subframes which are not included in any DL HARQ process may not be allocated as the protected subframes alone, they may be allocated as the protected subframes in combination with those UL subframes associated with the DL HARQ processes. For example, UL subframes 4 and 9 associated with the first and third DL HARQ processes may be allocated with UL subframes 3 and 8 which are not included in any DL HARQ process as the protected subframes for the small cell.

Therefore, according to the embodiment of the present disclosure, the protected subframes shall be allocated based at least on a subset of the DL HARQ processes; and otherwise there may be a risk of link failure in either the macro cell or small cell.

It shall be understood that the above determined subset and the allocated protected subframes are only illustrative rather than limiting the scope of the disclosure. Another subset comprising a different number of DL HARQ processes may also be possible. The number of DL HARQ processes that may be comprised in the determined subset differs from 1 to a total number of the DL HARQ processes minus one.

Case (II)

A specific method for coordinating inter-cell interference in Case (II) according to an embodiment of the present disclosure will be described with reference to an example of FIG. 3, in which UL-DL configuration 1 is used as an example of the current subframe configuration that comprises four UL subframes and six DL subframes and an example of FIG. 4, in which UL-DL configuration 2 is used as an example of the current subframe configuration that comprises two UL subframes and eight DL subframes. In this case, UL HARQ processes will be considered.

Reference is first made to FIG. 3(a), in which a frame structure based on UL-DL configuration 1 is illustrated. Similarly to FIG. 2(a), a block with an upward arrow in FIG. 3(a) represents an UL subframe and a block with a downward arrow represents a DL subframe. FIG. 3(a) illustrates two frames, each of which comprises ten subframes 0-9. With this subframe configuration, four UL HARQ processes may be formed. In particular, UL subframe 2 is paired with DL subframe 6 to form a first UL HARQ process; UL subframe 3 is paired with DL subframe 9 to form a second UL HARQ process; UL subframe 7 is paired with DL subframe 1 to form a third UL HARQ process; and UL subframe 8 is paired with DL subframe 4 to form a fourth UL HARQ process. Each of the UL HARQ processes includes an UL subframe on which data may be transmitted in a PUSCH and the paired DL subframe on which a UL scheduling grant for the data transmission on the UL subframe may be transmitted in a PDCCH and the ACK/NACK to the data transmission on the UL subframe may be transmitted in a PHICH.

In this embodiment, the type of interference from the macro cell to the small cell is the DL-dominant interference, which corresponds to the situation illustrated in FIG. 1(b), and the current subframe configuration comprises more DL subframes than UL subframes. In order to reduce the impact of the DL-dominant interference, DL protected subframes will be allocated for the small cell, particularly for the UEs located at the edge of the small cell (which will be referred to as "small cell-edge UEs"). The "small cell-edge UEs" refer to UEs in the small cell which may be impacted more seriously by DL interference from the macro cell than by UL interference from the macro cell. Since UEs located in the center of the small cell may not be impacted by the DL interference or the impact to them may be ignored (these UEs will be referred to as "small cell-center UEs" hereafter), the protected subframes may or may not be allocated to them.

Firstly, a subset of the UL HARQ processes is determined. In the example as illustrated in FIG. 3, the subset of UL HARQ processes is determined as comprising the second UL HARQ process and the fourth UL HARQ process. Then, DL subframes in the determined subset are allocated as the protected subframes for the small cell. For example, as illustrated in FIG. 3(b), DL subframes 4 and 9 may be allocated as the protected subframe for the small-cell, particularly for the small cell-edge UEs, e.g. UE2 in FIG. 1(b). The determined "subset" restricts the protected subframe allocation from allocating all DL subframes associated with the UL HARQ processes as the protected subframes, which extreme case may lead to a lack of effective resources for UL data transmission in the macro cell and thus lead to a link failure in the macro cell.

These protected subframes may be utilized in various ways, either following 3GPP standard or using proprietary implementations. On small-cell side, as illustrated in FIG. 3(b), the small-cell base station, e.g. BS2 as illustrated in FIG. 1(b), may schedule normal DL data transmission for all UEs within the small cell following the regulation that the small cell-edge UEs are scheduled on the protected subframes 4 and 9. Correspondingly, the small-cell base station may schedule normal UL data transmission for all UEs in the small cell, including the small cell-edge UEs on the UL subframes 3 and 8 paired with the DL protected subframes 4 and 9. As for other DL subframes 0, 1, 5 and 6 than the DL protected subframes 4 and 9, the small-cell base station may schedule normal DL data transmission for the small cell-center UEs only on them. As for other UL subframes 2 and 7, the small-cell base station may schedule normal UL data transmission for the small cell-center UEs only on them.

On macro-cell side, as illustrated in FIG. 3(c), the macro-cell base station, e.g. BS1 as illustrated in FIG. 1(b), may not schedule any normal DL transmission on the DL protected subframes 4 and 9. Correspondingly, on the UL subframes 3 and 8 paired with the DL protected subframes 4 and 9, only some control channels, such as PUCCH, may be scheduled. As for other DL subframes 0, 1, 5 and 6 than the protected subframes 4 and 9, the macro-cell base station may schedule normal DL transmission on them. As for other UL subframes 2 and 7 which are not included in the determined subset, the macro-cell base station may schedule normal UL transmission on them.

By this way, the DL interference from the macro cell to the small cell, particularly to the cell-edge UEs, may be alleviated.

According to the embodiment of the present disclosure, the protected subframes are allocated from the UL HARQ processes. Otherwise, if the DL subframes which are not included in any UL HARQ process alone, e.g. DL subframes 0 and 5, are allocated as the DL protected subframes for the small cell-edge UEs, then although DL data transmission for the small cell-edge UEs are possible, UL data transmission of the small cell-edge UEs may fail, because the UL scheduling grant or ACK/NACK to the UL data transmission has to be transmitted in the PDCCH or PHICH associated with a UL HARQ process, which would suffer from strong interference from the macro cell. Although the DL subframes which are not included in any UL HARQ process may not be allocated as the protected subframes alone, they may be allocated as the protected subframes in combination with those DL subframes associated with the DL HARQ processes. For example, DL subframes 4 and 9 associated with the second and fourth UL HARQ processes may be allocated together with DL subframes 0 and 5 which are not included in any UL HARQ process as the protected subframes for the small cell, particularly for the small cell-edge UEs.

Therefore, according to the embodiment of the present disclosure, the protected subframes shall be allocated based at least on a subset of the UL HARQ processes; and otherwise there may be a risk of link failure in either the macro cell or small cell.

It shall be understood that the above determined subset and the allocated protected subframes are only illustrative rather than limiting the scope of the disclosure. Another subset comprising a different number of UL HARQ processes may also be possible. The number of UL HARQ processes that may be comprised in the determined subset differs from 1 to a total number of the UL HARQ processes minus one.

Reference is now made to FIG. 4(a), in which a frame structure based on UL-DL configuration 2 is illustrated. Similarly to FIG. 3(a), a block with an upward arrow in FIG. 4(a) represents an UL subframe and a block with a downward arrow represents a DL subframe. FIG. 4(a) illustrates two frames, each of which comprises ten subframes 0-9. With this subframe configuration, two UL HARQ processes may be formed. In particular, UL subframe 2 is paired with DL subframe 8 to form a first UL HARQ process; and UL subframe 7 is paired with DL subframe 3 to form a second UL HARQ process. Each of the UL HARQ processes includes an UL subframe on which data may be transmitted in a PUSCH and the paired DL subframe on which a UL scheduling grant for the data transmission on the UL subframe may be transmitted in a PDCCH and the ACK/NACK to the data transmission on the UL subframe may be transmitted in a PHICH.

In this embodiment, the type of interference from the macro cell to the small cell is the DL-dominant interference, which also corresponds to the situation illustrated in FIG. 1(b) and the current subframe configuration comprises more DL subframes than UL subframes. In order to reduce the impact of the DL-dominant interference, DL protected subframes will be allocated for the small cell, particularly for small cell-edge UEs.

Firstly, a subset of the UL HARQ processes is determined. Since there are only two UL HARQ processes, the subset of the UL HARQ processes may be determined as comprising either the first UL HARQ process or the second UL HARQ process. In the illustrated example, the subset is determined as comprising the first UL HARQ process. Then, DL subframe in the determined subset is allocated as the protected subframe for the small cell. For example, as illustrated in FIG. 4(b), DL subframe 8 is allocated as the protected subframe for the small-cell, particularly for the small cell-edge UEs, e.g. UE2 in FIG. 1(b).

The protected subframe may be utilized in various ways, either following 3GPP standard or using proprietary implementations. On small-cell side, as illustrated in FIG. 4(b), the small-cell base station, e.g. BS2 as illustrated in FIG. 1(b), may schedule normal DL data transmission for all UEs within the small cell following the regulation that the small cell-edge UEs are scheduled on the protected subframe 8. Correspondingly, the small-cell base station may schedule normal UL data transmission for all UEs in the small cell, including the small cell-edge UEs on the UL subframe 2 paired with the DL protected subframe 8. As for other DL subframes 0, 1, 3, 4, 5, 6 and 9 than the DL protected subframe 8, the small-cell base station may schedule normal DL data transmission for the small cell-center UEs only on them. As for other UL subframe 7, the small-cell base station may schedule normal UL data transmission only for the small cell-center UEs on them.

On macro-cell side, as illustrated in FIG. 4(c), the macro-cell base station, e.g. BS1 as illustrated in FIG. 1(b), may not schedule any normal DL transmission on the DL protected subframe 8. Correspondingly, on the UL subframe 2 paired with the DL protected subframe 8, only some control channels, such as PUCCH, may be scheduled. As for other DL subframes 0, 1, 3, 4, 5, 6 and 9 than the protected subframe 8, the macro-cell base station may schedule normal DL transmission on them. As for other UL subframe 7 which is not included in the determined subset, the macro-cell base station may schedule normal UL transmission on them.

By this way, the DL interference from the macro cell to the small cell, particularly to the cell-edge UEs, may be alleviated.

Figure 3:
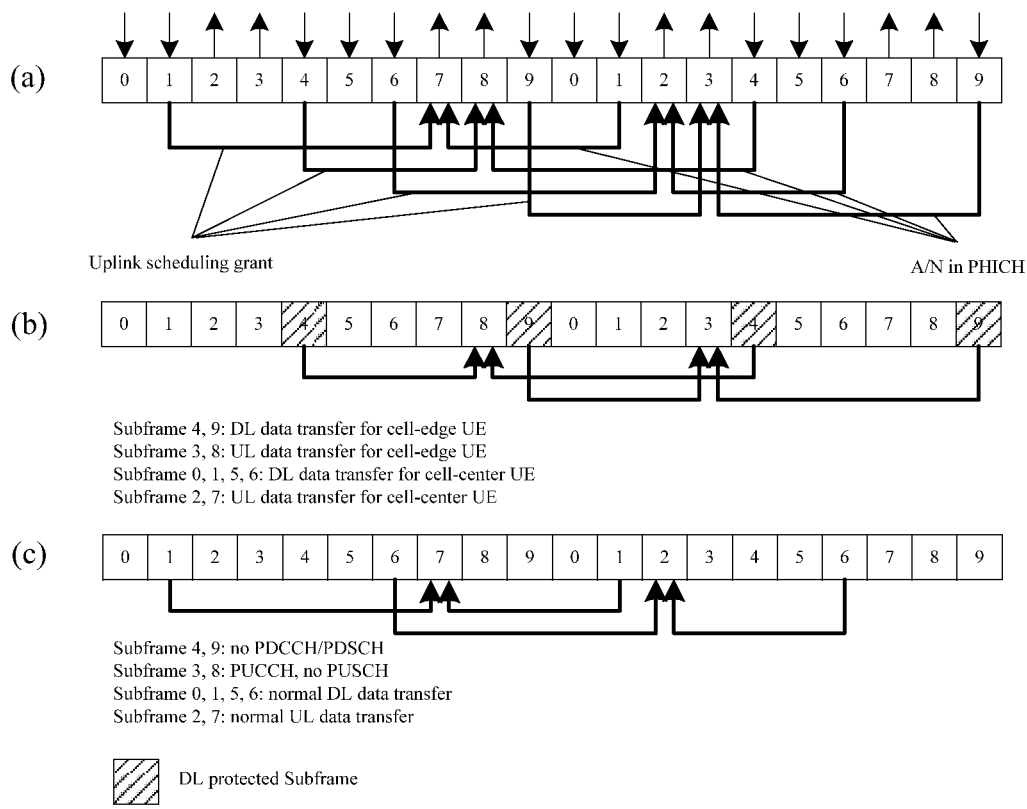
FIG. 3 illustrates a specific method for coordinating inter-cell interference in Case (II) according to an embodiment of the present disclosure.
Figure 4:
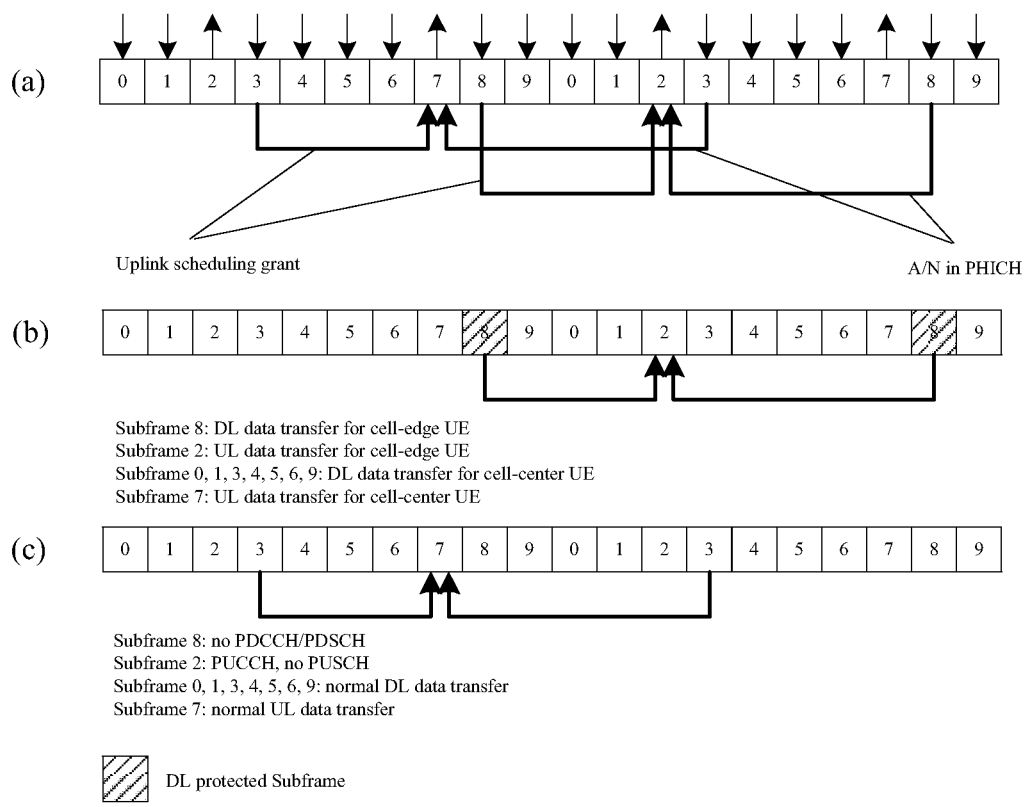
FIG. 4 illustrates a specific method for coordinating inter-cell interference in Case (II) according to an embodiment of the present disclosure.

Similarly to the example as illustrated in FIG. 3, the protected subframe in this example is allocated from the UL HARQ processes. However, the DL subframes which are not included in any UL HARQ process may also be allocated as the protected subframes in combination with those DL subframes associated with the DL HARQ processes. For example, DL subframe 8 associated with the first UL HARQ process may be allocated together with DL subframes 0, 1, 4, 5, 6 and 9 which are not included in any UL HARQ process as the protected subframes for the small cell, particularly for the small cell-edge UEs.

It shall be understood that the above determined subset and the allocated protected subframes are only illustrative rather than limiting the scope of the disclosure. Another subset comprising the second UL HARQ process may also be possible.

Case (III)

A specific method for coordinating inter-cell interference in Case (III) according to an embodiment of the present disclosure will be described with reference to FIG. 5, in which UL-DL configuration 0 is used as an example of the current subframe configuration that comprises six UL subframes and four DL subframes. In this case, DL HARQ processes will be considered.

Reference is now made to FIG. 5(a), in which a frame structure based on UL-DL configuration 0 is illustrated. Similarly to the first embodiment, four DL HARQ processes may be formed, which will not be detailed for the purpose of conciseness.

In this embodiment, the type of interference from the macro cell to the small cell is the bidirectional interference and the current subframe configuration comprises more UL subframes than DL subframes. In order to reduce the impact of the bidirectional interference, both DL and UL protected subframes will be allocated for the small cell.

Firstly, a subset of the DL HARQ processes is determined. In the example as illustrated in FIG. 5, the subset of DL HARQ processes is determined as comprising the first HARQ process and the third HARQ process. Then, all DL and UL subframes in the determined subset are allocated as the protected subframes for the small cell. For example, as illustrated in FIG. 5(b), DL subframes 0 and 5 are allocated as the DL protected subframes and the paired UL subframes 4 and 9 are allocated as the UL protected subframes for the small-cell. The determined "subset" restricts the protected subframe allocation from allocating all UL subframes associated with the DL HARQ processes as the protected subframes, which extreme case may lead to a lack of effective resources for DL data transmission in the macro cell and thus lead to a link failure in the macro cell.

These protected subframes may be utilized in various ways, either following 3GPP standard or using proprietary implementations. On small-cell side, as illustrated in FIG. 5(b), the small-cell base station may schedule normal UL data transmission for all UEs within the small cell on the UL protected subframes 4 and 9. Correspondingly, the small-cell base station may schedule normal DL data transmission for all UEs within the small cell on the DL protected subframes 0 and 5. As for other UL subframes 2, 3, 7 and 8 than the UL protected subframes 4, 9, the small-cell base station may not schedule any normal UL transmission on them. As for other DL subframes 1 and 6 than the DL protected subframes 0 and 5, the small-cell base station may not schedule any normal DL transmission on them, and preferably avoid scheduling control channels such as BCCH and PCCH.

Figure 5:
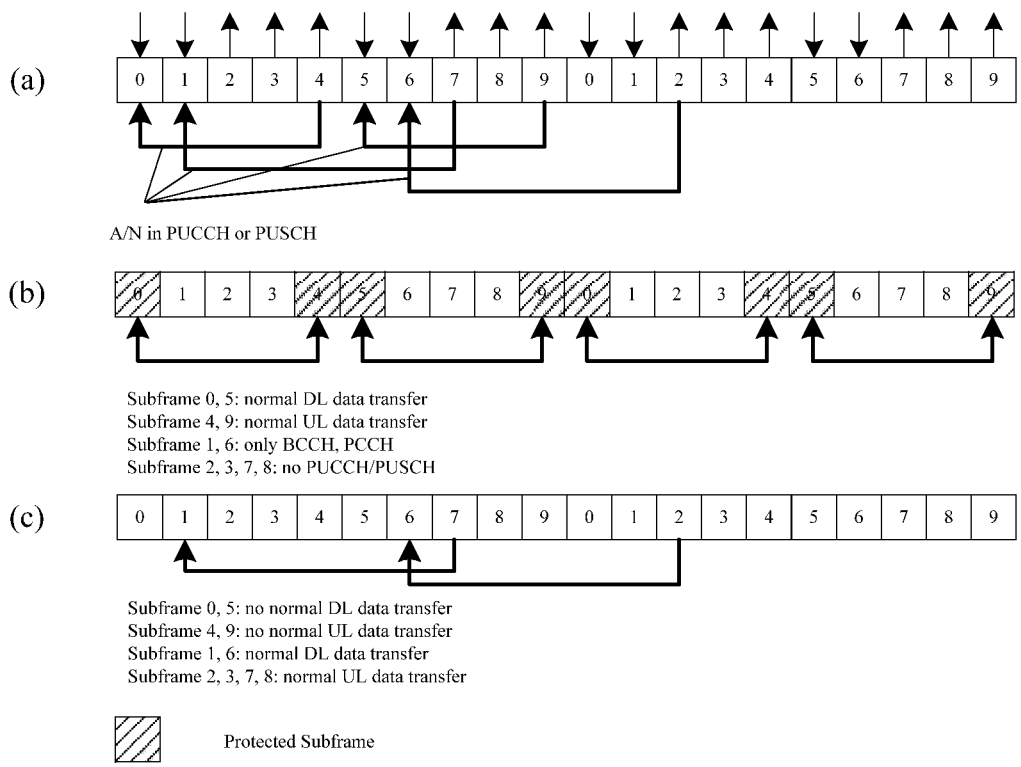
FIG. 5 illustrates a specific method for coordinating inter-cell interference in Case (IIII) according to an embodiment of the present disclosure.

On macro-cell side, as illustrated in FIG. 5(*c*), the macro-cell base station may not schedule any normal DL transmission on the DL protected subframes 0 and 5. On the UL protected subframes 4 and 9, the macro-cell base station may not schedule any normal UL transmission, and preferably avoid scheduling control channels such as a PUCCH. As for other UL subframes 2, 3, 7 and 8 than the UL protected subframes 4 and 9, the macro-cell base station may schedule normal UL transmission on them. As for other DL subframes 1 and 6 than the DL protected subframes 0 and 5, the macro-cell base station may schedule normal DL transmission on them.

By this way, the bidirectional interference from the macro cell to the small cell may be alleviated.

According to the embodiment of the present disclosure, all the UL protected subframes are allocated from the DL HARQ processes. Otherwise, if the UL subframes which are not included in any DL HARQ process alone, e.g. UL subframes 3 and 8, are allocated as the UL protected subframes for UEs in the small cell, then although UL data transmission of UEs in the small cell are possible, DL data transmission for the UEs may fail, because the ACK/NACK to the DL data transmission has to be transmitted in the PUCCH or PUSCH associated with a DL HARQ process, which would suffer from strong interference from the macro cell. Although the UL subframes which are not included in any DL HARQ process may not be allocated as the UL protected subframes alone, they may be allocated as the UL protected subframes in combination with those UL subframes associated with the DL HARQ processes. For example, UL subframes 4 and 9 associated with the first and third DL HARQ processes may be allocated together with UL subframes 3 and 8 which are not included in any DL HARQ process as the UL protected subframes for the small cell.

Therefore, according to the embodiment of the present disclosure, the protected subframes shall be allocated based at least on a subset of the DL HARQ processes; and otherwise there may be a risk of link failure in either the macro cell or small cell.

It shall be understood that the above determined subset and the allocated protected subframes are only illustrative rather than limiting the scope of the disclosure. Another subset comprising a different number of DL HARQ processes may also be possible. The number of DL HARQ processes that may be comprised in the determined subset differs from 1 to a total number of the DL HARQ processes minus one.

Case (IV)

A specific method for coordinating inter-cell interference in Case (IV) according to an embodiment of the present disclosure will be described with reference to FIG. 6, in which UL-DL configuration 1 is used as an example of the current subframe configuration that comprises four UL subframes and six DL subframes. In this case, UL HARQ processes will be considered.

Figure 6:
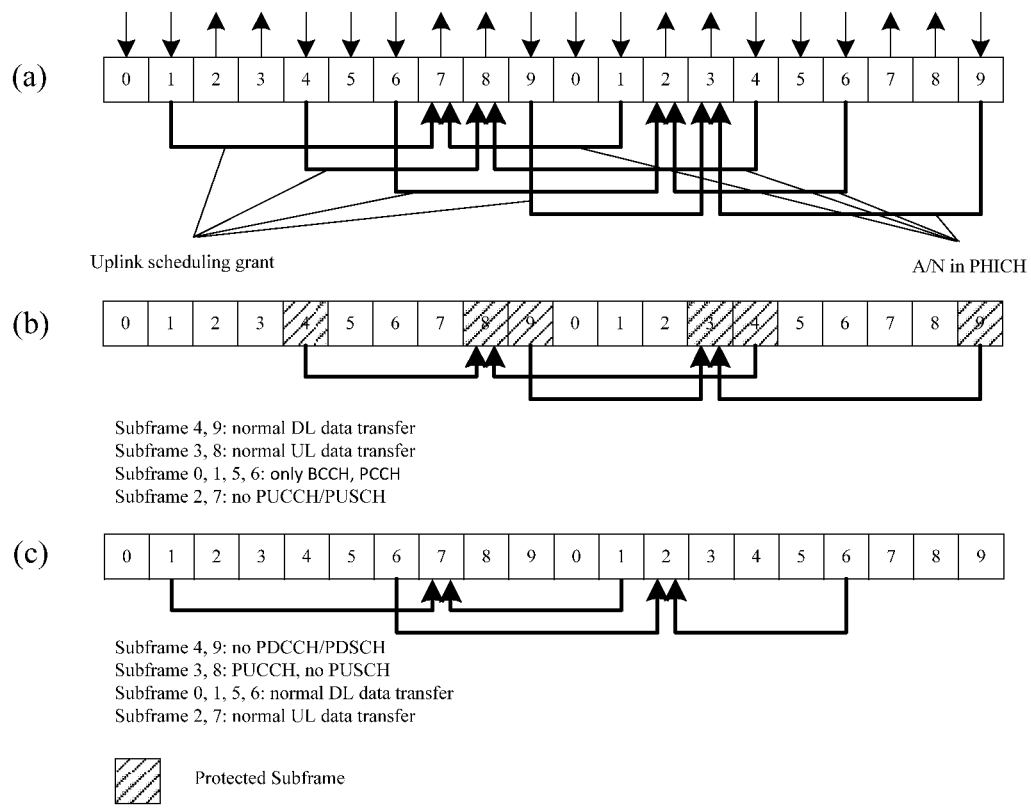
FIG. 6 illustrates a specific method for coordinating inter-cell interference in Case (IV) according to an embodiment of the present disclosure.

Reference is now made to FIG. 6(*a*), in which a frame structure based on UL-DL configuration 1 is illustrated. Similarly to the second embodiment, four UL HARQ processes may be formed, which will not be detailed for the purpose of conciseness.

In this embodiment, the type of interference from the macro cell to the small cell is the bidirectional interference and the current subframe configuration comprises more DL subframes than UL subframes. In order to reduce the impact of the bidirectional interference, both DL and UL protected subframes will be allocated for the small cell.

Firstly, a subset of the UL HARQ processes is determined. In the example as illustrated in FIG. 6, the subset of UL HARQ processes is determined as comprising the second UL HARQ process and the fourth UL HARQ process. Then, all DL and UL subframes in the determined subset are allocated as the protected subframes for the small cell. For example, as illustrated in FIG. 6(*b*), DL subframes 4 and 9 are allocated as the DL protected subframe for the small-cell and UL subframes 3 and 8 are allocated as the UL protected subframe for the small-cell. The determined "subset" restricts the protected subframe allocation from allocating all DL subframes associated with the UL HARQ processes as the protected subframes, which extreme case may lead to a lack of effective resources for UL data transmission in the macro cell and thus lead to a link failure in the macro cell.

These protected subframes may be utilized in various ways, either following 3GPP standard or using proprietary implementations. On small-cell side, as illustrated in FIG. 6(*b*), the small-cell base station may schedule normal UL data transmission for all UEs within the small cell on the UL protected subframes 3 and 8. Correspondingly, the small-cell base station may schedule normal DL data transmission for all UEs within the small cell on the DL protected subframes 4 and 9. As for other UL subframes 2 and 7 than the UL protected subframes 3 and 8, the small-cell base station may not schedule any normal UL transmission on them. As for other DL subframes 0, 1, 5 and 6 than the DL protected subframes 3 and 8, the small-cell base station may not schedule any normal DL transmission on them for the small cell-edge UEs, and preferably avoid scheduling only some control channels, such as BCCH and PCCH are transmitted on them.

On macro-cell side, as illustrated in FIG. 6(*c*), the macro-cell base station may not schedule any normal DL transmission on the DL protected subframes 4 and 9. On the UL protected subframes 3 and 8, the macro-cell base station may not schedule any normal UL transmission, and preferably avoid scheduling control channels such as PUCCH. As for other UL subframes 2 and 7 than the UL protected subframes 3 and 8, the macro-cell base station may schedule normal UL transmission on them. As for other DL subframes 0, 1, 5 and 6 than the DL protected subframes 3 and 8, the macro-cell base station may schedule normal DL transmission on them.

By this way, the bidirectional interference from the macro cell to the small cell may be alleviated.

According to the embodiment of the present disclosure, all the protected subframes are allocated from the UL HARQ processes. Otherwise, if the DL subframes which are not included in any UL HARQ process alone, e.g. DL subframes 0 and 5, are allocated as the DL protected subframes for small cell-edge UEs, then although DL data transmission of the small cell-edge UEs are possible, UL data transmission for the UEs may fail, because the ACK/NACK to the UL data transmission has to be transmitted in the PHICH associated with a UL HARQ process, which would suffer from strong interference from the macro cell. Although the DL subframes which are not included in any UL HARQ process may not be allocated as the DL protected subframes alone, they may be allocated as the DL protected subframes in combination with those DL subframes associated with the DL HARQ processes. For example, DL subframes 4 and 9 associated with the first and third DL HARQ processes may be allocated together with DL subframes 0 and 5 which are not included in any DL HARQ process as the DL protected subframes for the small cell.

Therefore, according to the embodiment of the present disclosure, the protected subframes shall be allocated based at least on a subset of the UL HARQ processes; and otherwise there may be a risk of link failure in either the macro cell or small cell.

It shall be understood that the above determined subset and the allocated protected subframes are only illustrative rather than limiting the scope of the disclosure. Another subset comprising a different number of DL HARQ processes may also be possible. The number of DL HARQ processes that may be comprised in the determined subset differs from 1 to a total number of the DL HARQ processes minus one.

In the following, descriptions will be made with reference to FIGS. 7-9 to set forth general methods for coordinating inter-cell interference in a HetNet that comprises a macro cell and one or more small cells according to several embodiments of the present disclosure. Those skilled in the art will appreciate that several embodiments of the present invention may be easily expanded to a HetNet system that comprises more macro cells, each of which comprises more than one small cells.

Figure 7:
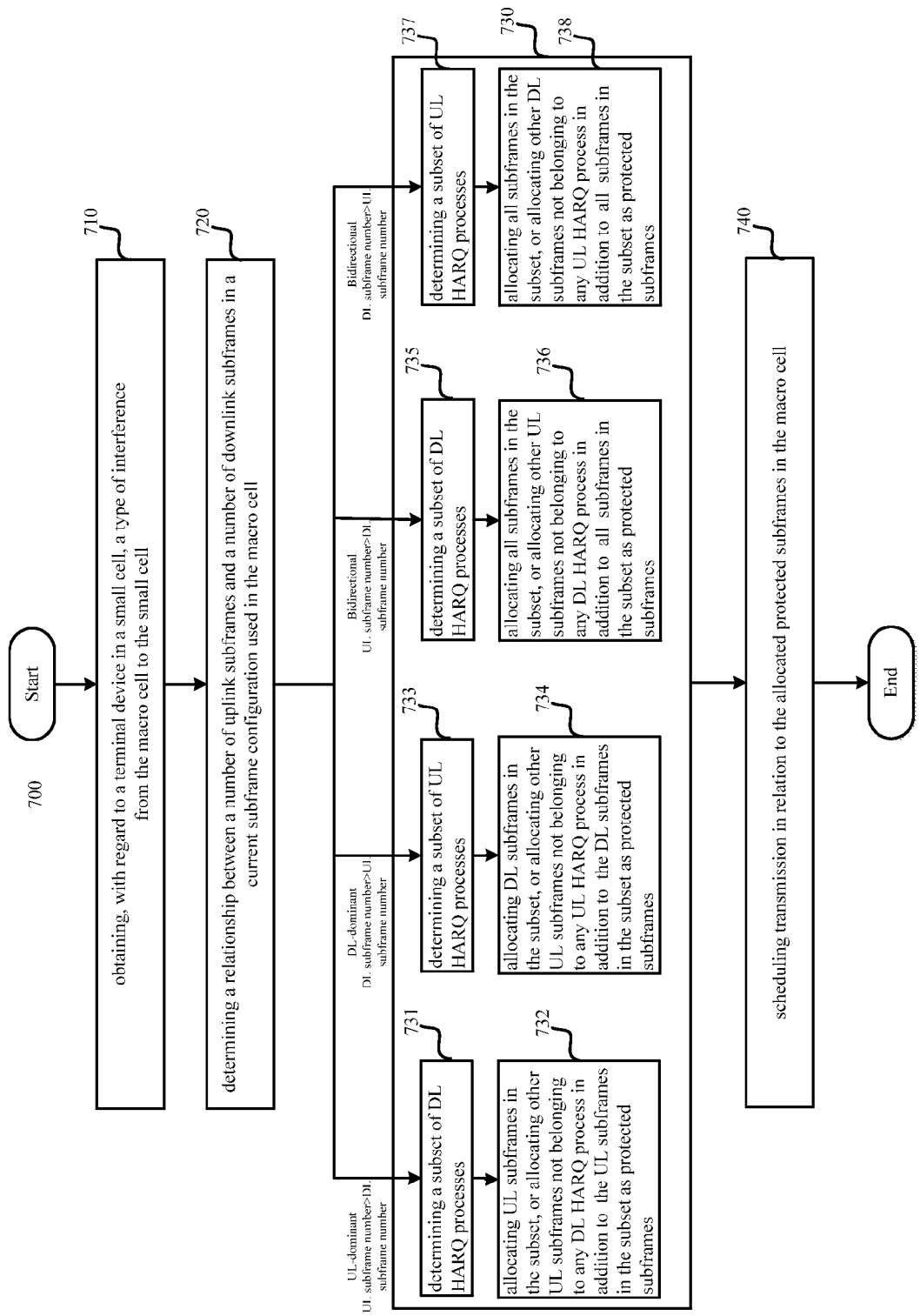
FIG. 7 illustrates a flowchart of a method 700 for coordinating inter-cell interference in a HetNet that comprises a macro cell and one or more small cells according to an embodiment of the present disclosure.

FIG. 7 illustrates a flowchart of a method 700 for coordinating inter-cell interference in a HetNet that comprises a macro cell and one or more small cells according to an embodiment of the present disclosure. The method 700 may be performed at a macro-cell base station that forms the macro cell.

The method 700 comprises obtaining, with regard to a terminal device in a small cell, a type of interference from the macro cell to the small cell in block 710. The type of interference may be UL-dominant interference, DL-dominant interference or bidirectional interference as discussed above.

Several approaches may be adopted to obtain the type of interference. For example, as introduced in the Background section with reference to FIG. 1, the type of interference may be commonly known according to the application of CRE or not. For another example, the type of interference may be indicated by the base station forming the small cell (which will be referred to as "small-cell base station" hereafter) through signaling over X2 interface.

In yet another example, the small-cell base station may locally measure the UL interference level from the macro cell and receive information indicating the DL interference level reported from the terminal device, and then indicate both the DL and UL interference levels to the macro-cell base station, e.g. through signaling over X2 interface. The macro-cell base station may preset a first threshold that may be a maximum UL interference level from the macro cell to the small cell, above which some criteria specifying signal reception qualities, such as Signal to Interference and Noise Ratio (SINR), Block Error Rate (BLER), or probability of ACKs being fed back and the like may not be satisfied. The macro base station may also preset a second threshold that may be a maximum DL interference level from the macro cell to the small cell, above which the aforesaid criteria specifying signal reception qualities may not be satisfied. If the indicated UL interference level is greater than the first preset threshold and the indicated DL interference level is not greater than the second preset threshold, then the type of interference may be determined as the UL-dominant interference; otherwise, if the indicated UL interference level is not greater than the first preset threshold and the indicated DL interference level is greater than the second preset threshold, then the type of interference may be determined as the DL-dominant interference, and if the indicated UL interference level is greater than the first preset threshold and the indicated DL interference level is greater than the second preset threshold, then the type of interference may be determined as the bidirectional interference.

Those skilled in the art will appreciate that other approaches for obtaining the type of interference are also possible and the scope of the present disclosure is not limited to any specific approach as introduced above.

The method 700 as illustrated in FIG. 7 also comprises determining, in block 720, a relationship between a number of UL subframes and a number of DL subframes in a current subframe configuration used in the macro cell. For a LTE TDD network which uses one of the seven UL-DL configurations as defined in 3GPP TS 36.211, the relationship between the numbers of UL and DL subframes may be directly known once the used UL-DL configuration number is known. For example, if UL-DL configuration 0 is used in the macro cell, then it is equivalently known that the number of UL subframes is larger than the number of DL subframes. However, for other TDD networks which may use UL-DL configurations different from those defined in the 3GPP standard, the operation in block 720 may comprise comparing the number of UL subframes and the number of DL subframes in the current subframe configuration and then determining the relationship as the number of UL subframes being larger than the number of DL subframes or the number of UL subframes being smaller than the number of DL subframes. It shall be understood that the operations in blocks 710 and 720 may also be performed reversely to the order as shown or concurrently.

The method 700 as illustrated in FIG. 7 further comprises allocating, in block 730, protected subframes for the terminal device according to the obtained type of interference and the determined relationship.

In one embodiment, the operation in block 730 may comprise, in response to the obtained type of interference being the UL-dominant interference and the determined relationship indicating that the number of UL subframes is larger than the number of DL subframes, determining, in block 731, a subset of DL HARQ processes in the current subframe configuration and in block 732, allocating UL subframes in the determined subset as the protected subframes for the terminal device or allocating the UL subframes in the determined subset together with one or more UL subframes not belonging to any DL HARQ process as the protected subframes for the terminal device.

The operation in block 730 may also comprise, in response to the obtained type of interference being the DL-dominant interference and the determined relationship indicating that the number of UL subframes is smaller than the number of DL subframes, determining, in block 733, a subset of UL HARQ processes in the current subframe configuration and in block 734, allocating DL subframes in the determined subset as the protected subframes for the terminal device or allocating the DL subframes in the determined subset together with one or more subframes not belonging to any UL HARQ process as the protected subframes for the terminal device.

The operation in block 730 may further comprise: in response to the obtained type of interference being the bidirectional interference, determining, in block 735, a subset of the DL HARQ processes and in block 736, allocating all DL and UL subframes in the determined subset as the allocated protected subframes for the terminal device or allocating all the DL and UL subframes in the determined subset together with UL subframes not belonging to any DL HARQ process as the protected subframes for the terminal device, if the determined relationship indicates that the number of UL subframes is larger than the number of DL subframes; or determining, in block 737, a subset of the UL HARQ processes and in block 738, allocating all DL and UL subframes in the determined subset as the allocated protected subframes for the terminal device or allocating all the DL and UL subframes in the determined subset together with DL subframes not belonging to any UL HARQ process as the protected subframes for the terminal device, if the determined relationship indicates that the number of UL subframes is smaller than the number of DL subframes.

The method 700 as illustrated in FIG. 7 further comprises scheduling, in block 740, transmission in relation to the protected subframes in the macro cell. Particularly, as for the case of UL-dominant interference, the macro-cell base station may schedule normal UL and DL data transmission for macro cell-center UEs on the protected subframes allocated for the small cell and the DL subframes paired with the protected subframes. As for the case of DL-dominant interference, the macro-cell base station may not schedule any normal DL transmission (without considering other interference coordination technologies, such as beamforming) on the protected subframes allocated for the small cell and on the UL subframes paired with the protected subframes, only some control channels, such as a PUCCH, or the UL data transfer without dynamic scheduling grant, such as semi-persistent scheduling (SPS), may be transmitted. As for the case of bidirectional interference, the macro-cell base station may not schedule any normal DL or UL data transmission on the protected subframes allocated form the small cell.

Figure 8:
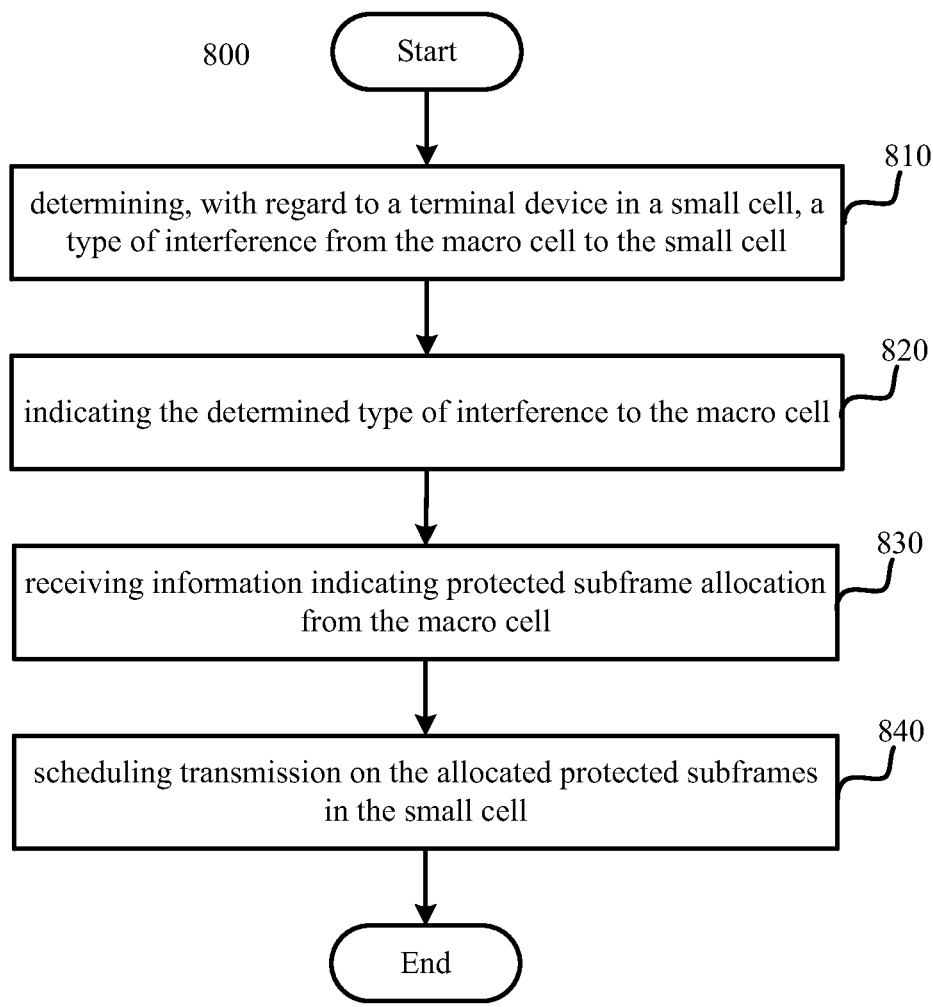
FIG. 8 illustrates a flowchart of a method 800 for coordinating inter-cell interference in a HetNet that comprises a macro cell and one or more small cells according to an embodiment of the present disclosure.

FIG. 8 illustrates a flowchart of a method 800 for coordinating inter-cell interference in a heterogeneous network that comprises a macro cell and one or more small cells according to an embodiment of the present disclosure. The method 800 may be performed at a small-cell base station that forms the small cell.

The illustrated method 800 comprises determining, with regard to a terminal device in a small cell, a type of interference from the macro cell to the small cell in block 810. The determination of the interference type in block 810 may rely on interference detection which may exploit a variety of existing methods. For example, the DL interference level may be obtained from Channel Quality Information (CQI) or Reference Signal Received Quality (RSRQ) reported from the terminal device based on the measurement on DL channels; or obtained by evaluating probability of NACKs being fed back. The UL interference level may be obtained by calculating the interference-over-thermal-noise (IoT) in UL signal reception at the small-cell base station. The small-cell base station may preset a first threshold that may be a maximum acceptable UL interference level from the macro cell to the small cell, above which some criteria specifying signal reception qualities, such as BLER, or probability of ACKs being fed back and the like may not be satisfied. The small-cell base station may also preset a second threshold that may be a maximum acceptable DL interference level from the macro cell to the small cell, above which the aforesaid criteria specifying signal reception qualities, such as SINR, BLER, or probability of ACKs being fed back and the like may not be satisfied. If the UL interference level is greater than the first preset threshold and the DL interference level is not greater than the second preset threshold, then the type of interference may be determined as the UL-dominant interference; otherwise, if the UL interference level is not greater than the first preset threshold and the DL interference level is greater than the second determined threshold, then the type of interference may be determined as the DL-dominant interference, and if the UL interference level is greater than the first preset threshold and the DL interference level is greater than the second preset threshold, then the type of interference may be determined as the bidirectional interference.

Alternatively, as introduced in the Background section with reference to FIG. 1, the type of interference may be commonly known according to the application of CRE or not.

Those skilled in the art will appreciate that other approaches for determining the type of interference are also possible and the scope of the present disclosure is not limited to any specific approach as introduced above.

The illustrated method 800 further comprises indicating, in block 820, the determined type of interference to the macro cell, for example through signaling over X2 interface, and then receiving, in block 830, information indicating protected subframe allocation from the macro cell, for example through signaling over X2 interface. The protected subframe allocation may be performed according to the type of interference and a relationship between a number of UL subframes and a number of DL subframes in a current subframe configuration used in the macro cell. The relationship between numbers of DL and UL subframes has been described above and will not be detailed herein for the sake of conciseness.

The protected subframe allocation may be implemented according to the operation in block 730 at the macro-cell base station, which will not be detailed herein for the sake of conciseness.

At last, the method 800 schedules, in block 840, transmission on the allocated protected subframes in the small cell.

Figure 9:
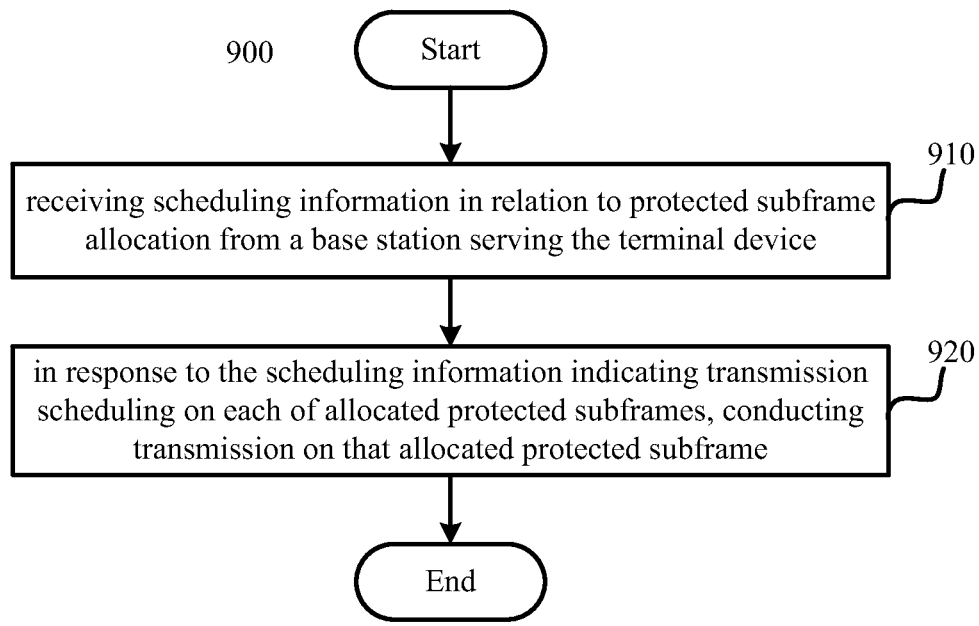
FIG. 9 illustrates a flowchart of a method 900 for coordinating inter-cell interference in a HetNet that comprises a macro cell and one or more small cells according to an embodiment of the present disclosure.

FIG. 9 illustrates a flowchart of a method 900 for coordinating inter-cell interference in a heterogeneous network that comprises a macro cell and one or more small cells according to an embodiment of the present disclosure. The method 900 may be performed at a terminal device in a small cell.

The method 900 comprises receiving, in block 910, scheduling information in relation to protected subframe allocation from a base station currently serving the terminal device in the heterogeneous network. For example, the scheduling information may comprise an UL scheduling grant or a DL scheduling grant.

Then the method 900 also comprises in block 920, in response to the scheduling information indicating transmission scheduling on each of allocated protected subframes, conducting transmission on that allocated protected subframes. The aforesaid protected subframe allocation is performed according to a type of interference from the macro cell to the small cell and a relationship between a number of UL subframes and a number of DL subframes in a current subframe configuration used in the macro cell. The type of interference and the relationship between numbers of UL and DL subframes have been described with reference to FIGS. 7 and 8, and thus will not be detailed herein for the sake of conciseness.

In one embodiment, in the case where the type of interference is the UL-dominant interference and the relationship indicates that the number of UL subframes is larger than the number of DL subframes, the allocated protected subframes used in method 900 may comprise UL subframes in a subset of DL HARQ processes in the current subframe configuration used in the macro cell. Alternatively, the allocated protected subframes may comprise UL subframes in a subset of the DL HARQ processes and one or more of the UL subframes not belonging to any DL HARQ process. In the case where the type of interference is the DL-dominant interference and the relationship indicates that the number of UL subframes is smaller than the number of DL subframes, the allocated protected subframes used in method 900 may comprise DL subframes in a subset of UL HARQ processes in the current subframe configuration used in the macro cell. Alternatively, the allocated protected subframes may comprise DL subframes in a subset of the UL HARQ processes and one or more of the DL subframes not belonging to any UL HARQ process. In the case where the type of interference is the bidirectional interference, the allocated protected subframes used in method 900 may comprise all DL and UL subframes in a subset of the DL HARQ processes, or one or more of the UL subframes not belonging to any DL HARQ process in addition to all DL and UL subframes in a subset of the DL HARQ processes, if the number of UL subframes is larger than the number of DL subframes. In the case where the type of interference is the bidirectional interference, the allocated protected subframes may comprise all DL and UL subframes in a subset of the UL HARQ processes, or one or more of the DL subframes not belonging to any UL HARQ process in addition to all DL and UL subframes a subset of the UL HARQ processes, if the number of UL subframes is smaller than the number of DL subframes.

By virtue of methods 700, 800 and 900, a terminal device in the small cell may be scheduled to conduct normal UL data transmission and/or DL data reception on the allocated protected subframes without interference or with acceptable interference. By providing appropriate resource allocation between the macro cell and small cell, the eICIC technique that involves the ABS pattern and CRE may be effectively utilized in a TDD system with a guarantee of both interference-free data transmission for the small cell and necessary service resources in the macro cell.

Figure 10:
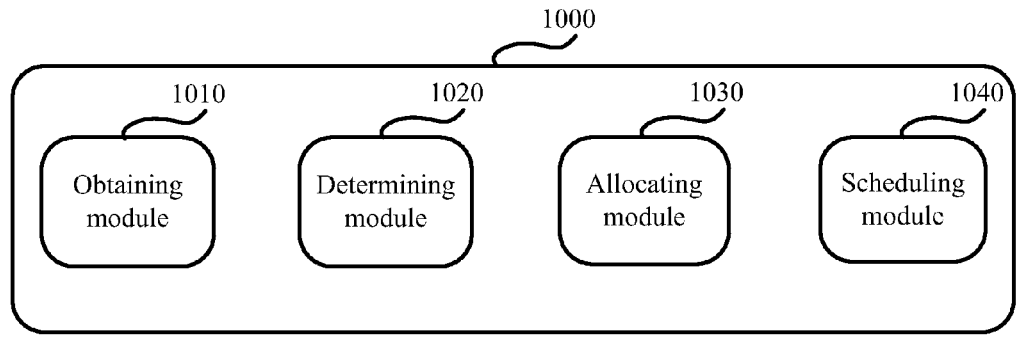
FIG. 10 illustrates a schematic block diagram of an apparatus 1000 adapted for coordinating inter-cell interference in a HetNet that comprises a macro cell and one or more small cells according to an embodiment of the present disclosure.

FIG. 10 illustrates a schematic block diagram of an apparatus 1000 adapted for coordinating inter-cell interference in a HetNet that comprises a macro cell and one or more small cells according to an embodiment of the present disclosure. The apparatus 1000 may be a base station forming the macro cell. As illustrated in FIG. 10, the apparatus 1000 comprises an obtaining module 1010, a determining module 1020, an allocating module 1030 and a scheduling module 1040.

The obtaining module 1010 is configured to obtain, with regard to a terminal device in a small cell, a type of interference from the macro cell to the small cell and to determine a relationship between a number of UL subframes and a number of DL subframes in a current subframe configuration used in the macro cell. Detailed operations of the obtaining module 1010 according to several embodiments are similar to those as described in relation to block 710 of FIG. 7, which thus will not be repeated herein for the purpose of conciseness.

The determining module 1020 is configured to determine a relationship between a number of UL subframes and a number of DL subframes in a current subframe configuration used in the macro cell. Detailed operations of the determining module 1020 according to several embodiments are similar to those as described in relation to block 720 of FIG. 7, which thus will not be repeated herein for the purpose of conciseness.

The allocating module 1030 is configured to allocate protected subframes for the terminal device according to the obtained type of interference and the determined relationship. Detailed operations of the determining module 1030 according to several embodiments are similar to those as described in relation to block 730 of FIG. 7, which thus will not be repeated herein for the purpose of conciseness.

The scheduling module 1040 is configured to schedule transmission in relation to the allocated protected subframes in the macro cell. Detailed operations of the determining module 1040 according to several embodiments are similar to those as described in relation to block 740 of FIG. 7, which thus will not be repeated herein for the purpose of conciseness.

Figure 11:
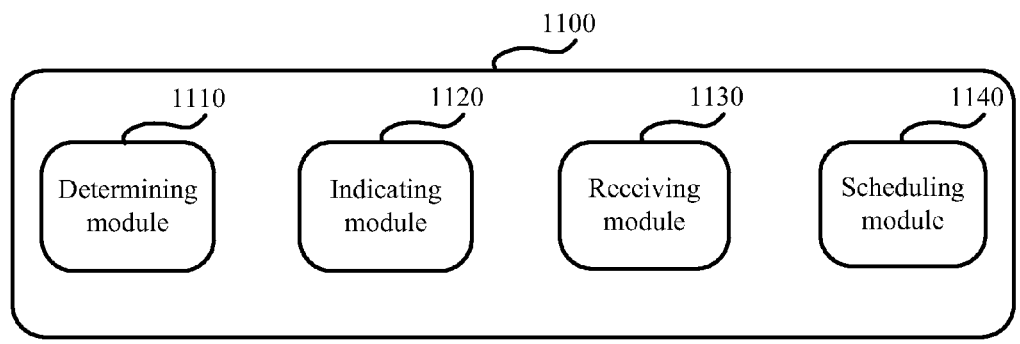
FIG. 11 illustrates an apparatus 1100 for coordinating inter-cell interference in a heterogeneous network that comprises a macro cell and one or more small cells according to an embodiment of the present disclosure.

FIG. 11 illustrates an apparatus 1100 for coordinating inter-cell interference in a heterogeneous network that comprises a macro cell and one or more small cells according to an embodiment of the present disclosure. The apparatus 1100 may be a base station forming a small cell. As illustrated in FIG. 11, the apparatus 1100 comprises a determining module 1110, an indicating module 1120, a receiving module 1130 and a scheduling module 1140.

The determining module 1110 is configured to determine, with regard to a terminal device in a small cell, a type of interference from the macro cell to the small cell. Detailed operations of the determining module 1130 according to several embodiments are similar to those as described in relation to block 810 of FIG. 8, which thus will not be repeated herein for the purpose of conciseness.

The indicating module 1120 is configured to indicate the determined type of interference to the macro cell, for example through signaling over X2 interface.

The receiving module 1130 is configured to receive information indicating protected subframe allocation from the macro cell, for example through signaling over X2 interface.

The scheduling module 1140 is configured to schedule transmission in relation to the allocated protected subframes in the small cell. The protected subframes are allocated according to a type of interference from the macro cell to the small cell and a relationship between a number of UL subframes and a number of DL subframes in a current subframe configuration of the macro cell as described with reference to method 700 according to some embodiments of the present disclosure, which will not be detailed herein for the purpose of conciseness.

Figure 12:
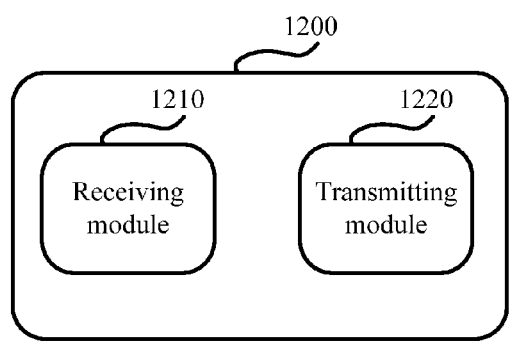
FIG. 12 illustrates a terminal device 1200 for coordinating inter-cell interference in a heterogeneous network that comprises a macro cell and one or more small cells according to an embodiment of the present disclosure.

FIG. 12 illustrates a terminal device 1200 adapted for coordinating inter-cell interference in a heterogeneous network that comprises a macro cell and one or more small cells according to an embodiment of the present disclosure. The terminal device 1200 comprises a receiving module 1210 and a transmitting module 1220.

The receiving module 1210 is configured to receive scheduling information in relation to protected subframe allocation from a base station serving the terminal device. For example, the scheduling information may comprise a UL scheduling grant or DL scheduling grant.

The receiving module 1210 is further configured to, in response to the scheduling information indicating DL transmission scheduling on one or more of allocated protected subframes, conduct DL reception on the one or more of the allocated protected subframes.

The transmitting module 1220 is configured to, in response to the scheduling information indicating UL transmission scheduling on one or more of the allocated protected subframes, conduct UL transmission on the one or more of the allocated protected subframes. The protected subframes are allocated according to a type of interference from the macro cell to the small cell and a relationship between a number of UL subframes and a number of DL subframes in a current subframe configuration of the macro cell as described with reference to method 700 according to some embodiments of the present disclosure, which will not be detailed herein for the purpose of conciseness.

Figure 13:
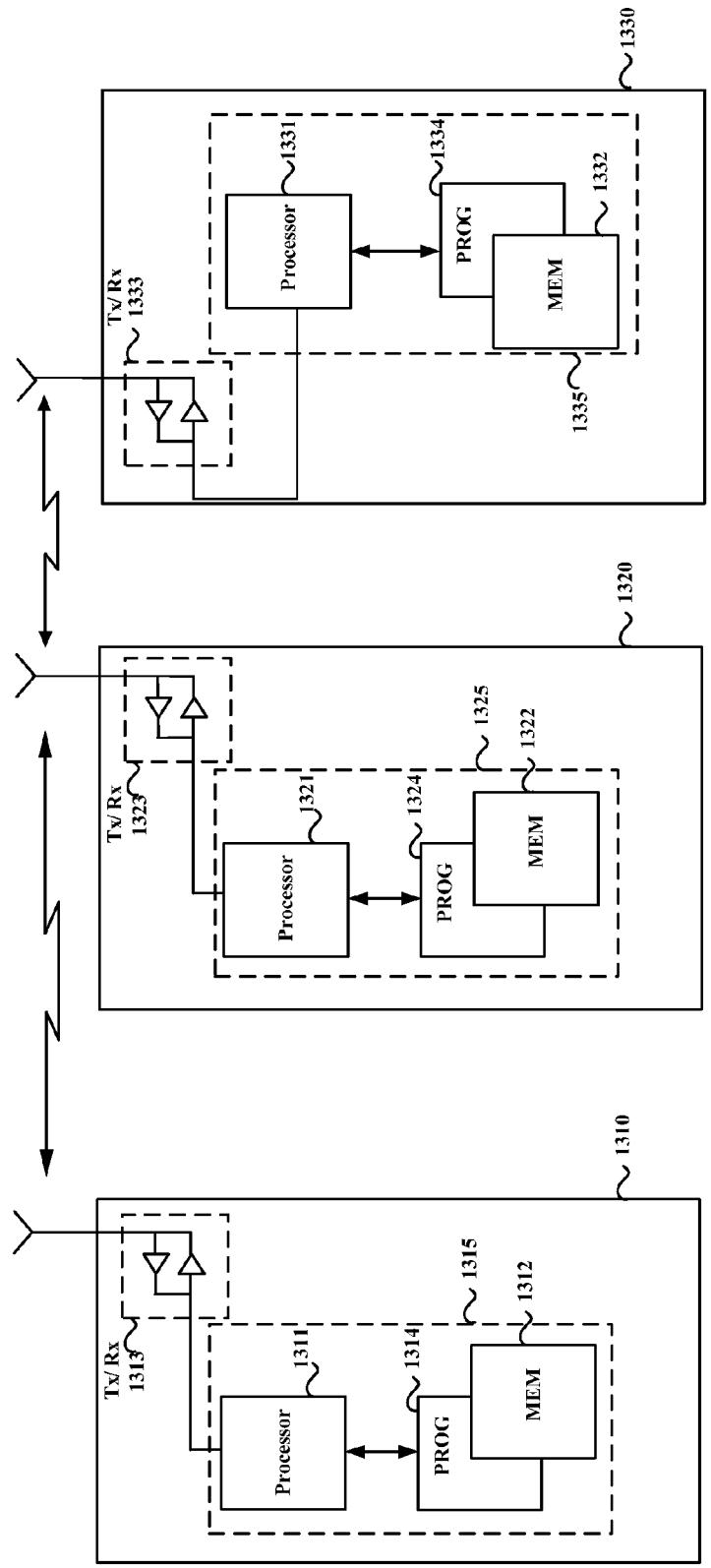
FIG. 13 illustrates a simplified block diagram of an apparatus 1310, an apparatus 1320 and a terminal device 1330 that are suitable for use in practicing the embodiments of the present invention.

FIG. 13 illustrates a simplified block diagram of an apparatus 1310, an apparatus 1320 and a terminal device 1330 that are suitable for use in practicing the embodiments of the present invention. The apparatus 1310 may be a macro-cell base station; the apparatus 1320 may be a small-cell base station and the terminal device 1330 may be a UE.

The apparatus 1310 comprises at least one processor 1311, such as a data processor (DP) 1311 and at least one memory (MEM) 1312 coupled to the processor 1311. The apparatus may further comprise a suitable RF transmitter TX and receiver RX 1313 (which may be implemented in a single component or separate components) coupled to the processor 1311. The MEM 1312 stores a program (PROG) 1314. The PROG 1314 may include instructions that, when executed on the associated processor 1311, enable the apparatus 1310 to operate in accordance with the embodiments of the present disclosure, for example to perform the method 700. The TX/RX 1313 may be used for bidirectional radio communication with other apparatuses or devices in the network, e.g. the apparatus 1320. Note that the TX/RX 1313 has at least one antenna to facilitate the communication. A combination of the at least one processor 1311 and the at least one MEM 1312 may form processing means 1315 adapted to implement various embodiments of the present disclosure.

The apparatus 1320 comprises at least one processor 1321, such as a DP, at least one MEM 1322 coupled to the processor 1321. The apparatus 1320 may further comprise a suitable RF TX/RX 1323 (which may be implemented in a single component or separate components) coupled to the processor 1321. The MEM 1322 stores a PROG 1324. The PROG 1324 may include instructions that, when executed on the associated processor 1321, enable the apparatus 1320 to operate in accordance with the embodiments of the present disclosure, for example to perform the method 800. The TX/RX 1323 is for bidirectional radio communications with other apparatuses or devices in the network, e.g. the apparatus 1310 or the terminal device 1330. Note that the TX/RX 1323 has at least one antenna to facilitate the communication. A combination of the at least one processor 1321 and the at least one MEM 1322 may form processing means 1325 adapted to implement various embodiments of the present disclosure.

The terminal device 1330 comprises at least one processor 1331, such as a DP, and at least one MEM 1332 coupled to the processor 1331. Depending on different implementations, the terminal device 1330 may further comprise a suitable RF TX/RX 1333 coupled to the processor 1331 so as to establish wireless connections with other devices or apparatuses in the network, e.g. the apparatus 1320. The MEM 1332 stores a PROG 1334. The program 1334 may comprise instructions that, when executed on the associated processor 1331, enable the terminal device 1330 to operate in accordance with the embodiments of the present disclosure, for example to perform the method 900. A combination of the at least one processor 1331 and the at least one MEM 1332 may form processing means 1335 adapted to implement various embodiments of the present disclosure.

Various embodiments of the present invention may be implemented by computer program executable by one or more of the processor 1311, 1321 and 1331 in software, firmware, hardware or in a combination thereof.

The MEMs 1312, 1322 and 1332 may be of any type suitable to the local technical environment and may be implemented using any suitable data storage technology, such as semiconductor based memory devices, magnetic memory devices and systems, optical memory devices and systems, fixed memory and removable memory, as non-limiting examples. While only one MEM is shown in the apparatuses 1310, 1320 or terminal device 1330, there may be several physically distinct memory units in them.

The processors 1311, 1321 and 1331 may be of any type suitable to the local technical environment, and may include one or more of general purpose computers, special purpose computers, microprocessors, digital signal processors (DSPs) and processors based on multicore processor architecture, as non-limiting examples. Each of the apparatuses 1310, 1320 and terminal device 1330 may have multiple processors, such as an application specific integrated circuit (ASIC) chip that is slaved in time to a clock which synchronizes the main processor.

Although the above description is made in the context of LTE TDD HetNet, it should not be construed as limiting the spirit and scope of the present disclosure. The idea and concept of the present disclosure can be generalized to also cover other TDD networks. In addition, the UL-DL configurations defined in the 3GPP standard are merely examples for illustrating the idea and concept of the present disclosure and should not be construed as limiting.

According to the above descriptions, there are also provided some other aspects of the present disclosure, which will be listed in the following supplementary notes.

Supplementary Note 1

According some embodiments of the present disclosure, there is provided a method for coordinating inter-cell interference in a heterogeneous network that comprises a macro cell and one or more small cells, wherein TDD UL-DL configuration 0 is used in the macro cell. The method comprises, in response to an impact of DL interference from the macro cell on a small cell is not more serious than the impact of UL interference from the macro cell on the small cell with regard to a terminal device in the small cell, determining a subset of DL HARQ processes in the TDD UL-DL configuration 0. The method further comprises allocating protected subframes for the terminal device based on the determined subset and scheduling transmission in relation to the allocated protected subframes.

In one embodiment, said allocating protected subframes may further comprise allocating UL subframes in the determined subset as the protected subframes if the impact of the UL interference is more serious than the impact of the DL interference; or allocating all DL and UL subframes in the determined subset as the protected subframes if the impact of the UL interference is equivalent to the impact of the DL interference.

In another embodiment, the allocated protected subframes may further comprise one or more of the UL subframes not belonging to any DL HARQ process.

Supplementary Note 2

According some embodiments of the present disclosure, there is provided a method for coordinating inter-cell interference in a heterogeneous network that comprises a macro cell and one or more small cells, wherein TDD UL-DL configuration 1 is used. The method comprises, in response to an impact of UL interference from the macro cell on a small cell is not more serious than the impact of DL interference from the macro cell on the small cell with regard to a terminal device in the small cell, determining a subset of UL HARQ processes in the TDD UL-DL configuration 1. The method further comprises allocating protected subframes for the terminal device based on the determined subset and scheduling transmission in relation to the allocated protected subframes.

In one embodiment, said allocating protected subframes may further comprise allocating DL subframes in the determined subset as the protected subframes, if the impact of the DL interference is more serious than the impact of the UL interference; or allocating all DL and UL subframes in the determined subset as the protected subframes if the impact of the DL interference is equivalent to the impact of the UL interference.

In another embodiment, the allocated protected subframes may further comprise one or more of the DL subframes not belonging to any UL HARQ process.

Supplementary Note 3

According some embodiments of the present disclosure, there is provided a method for coordinating inter-cell interference in a heterogeneous network that comprises a macro cell and one or more small cells, wherein TDD UL-DL configuration 2 is used. The method comprises, in response to an impact of UL interference from the macro cell on a small cell is not more serious than the impact of DL interference from the macro cell on the small cell with regard to a terminal device in the small cell, allocating protected subframes for the terminal device based on either of two UL HARQ processes and scheduling transmission in relation to the allocated protected subframes.

In one embodiment, said allocating protected subframes may further comprise allocating DL subframes in either of the two UL HARQ processes as the protected subframes, if the impact of the DL interference is more serious than the impact of the UL interference; or allocating all DL and UL subframes in either of the two UL HARQ processes as the protected subframes, if the impact of the DL interference is equivalent to the impact of the UL interference.

In another embodiment, the allocated protected subframes may further comprise one or more of the DL subframes not belonging to any UL HARQ process.

Supplementary Note 4

According to some embodiments of the present disclosure, there is provided a method for coordinating inter-cell interference in a heterogeneous network that comprises a macro cell and one or more small cells according to an embodiment of the present disclosure. The method comprises determining, with regard to a terminal device in a small cell, a type of interference from the macro cell to the small cell. The method also comprises indicating the determined type of interference to the macro cell and then receiving information indicating protected subframe allocation from the macro cell. The method further comprises scheduling transmission on the allocated protected subframes in the small cell.

In one embodiment, said determining a type of interference may comprise: determining the type of interference as uplink-dominant interference, if an impact of uplink interference from the macro cell on the small cell is more serious than an impact of downlink interference from the macro cell on the small cell; determining the type of interference as downlink-dominant interference, if the impact of the downlink interference on the small cell is more serious than the impact of the uplink interference on the small cell; and determining the type of interference as bidirectional interference, if the impact of the uplink interference on the small cell is equivalent to the impact of the downlink interference on the small cell.

Supplementary Note 5

According to some embodiments of the present disclosure, there is provided an apparatus for coordinating inter-cell interference in a heterogeneous network that comprises a macro cell and one or more small cells according to an embodiment of the present disclosure. The apparatus comprises a determining module configured to determine, with regard to a terminal device in a small cell, a type of interference from the macro cell to the small cell, an indicating module configured to indicate the determined type of interference to the macro cell, a receiving module configured to receive information indicating protected subframe allocation from the macro cell and a scheduling module configured to schedule transmission in relation to the allocated protected subframes in the small cell, wherein protected subframes are allocated according to a type of interference from the macro cell to the small cell and a relationship between a number of UL subframes and a number of DL subframes in a current subframe configuration of the macro cell.

In one embodiment, said determining module may be further configured to determine the type of interference as uplink-dominant interference, if an impact of uplink interference from the macro cell on the small cell is more serious than an impact of downlink interference from the macro cell on the small cell; to determine the type of interference as downlink-dominant interference, if the impact of the downlink interference on the small cell is more serious than the impact of the uplink interference on the small cell; and to determine the type of interference as bidirectional interference, if the impact of the uplink interference on the small cell is equivalent to the impact of the downlink interference on the small cell.

Supplementary Note 6

According to some embodiments of the present disclosure, there is provided an apparatus adapted for coordinating inter-cell interference in a heterogeneous network that comprises a macro cell and one or more small cells. The apparatus comprises a processor and a memory, the memory containing instructions executable by the processor whereby the apparatus is operative to obtain, with regard to a terminal device in a small cell, a type of interference from the macro cell to the small cell, to determine a relationship between a number of uplink subframes and a number of downlink subframes in a current subframe configuration used in the macro cell, to allocate protected subframes for the terminal device according to the obtained type of interference and the determined relationship; and to schedule transmission in relation to the allocated protected subframes in the macro cell.

In one embodiment, the type of interference may comprise one of the following: uplink-dominant interference in which an impact of uplink interference from the macro cell on the small cell is more serious than an impact of downlink interference from the macro cell on the small cell; downlink-dominant interference in which the impact of the downlink interference on the small cell is more serious than the impact of the uplink interference on the small cell; and bidirectional interference in which the impact of the uplink interference on the small cell is equivalent to the impact of the downlink interference on the small cell.

In another embodiment, the memory comprised in the apparatus may further contain instructions executable by the processor whereby the apparatus is operative to determine a subset of DL HARQ processes in the current subframe configuration and allocate uplink subframes in the determined subset as the protected subframes for the terminal device, in response to the obtained type of interference being the uplink-dominant interference and the determined relationship indicating that the number of uplink subframes is larger than the number of downlink subframes; to determine a subset of uplink HARQ processes in the current subframe configuration and allocate downlink subframes in the determined subset as the protected subframes for the terminal device, in response to the obtained type of interference being the downlink-dominant interference and the determined relationship indicating that the number of uplink subframes is smaller than the number of downlink subframes; or to determine a subset of the downlink HARQ processes and allocate all subframes in the determined subset as the protected subframes for the terminal device if the determined relationship indicates that the number of uplink subframes is larger than the number of downlink subframes, or to determine a subset of the uplink HARQ processes and allocating all subframes in the determined subset as the protected subframes for the terminal device if the determined relationship indicates that the number of uplink subframes is smaller than the number of downlink subframes, in response to the obtained type of interference being the bidirectional interference.

In yet another embodiment, the memory comprised in the apparatus may further contain instructions executable by the processor whereby the apparatus is operative to determine a subset of DL HARQ processes in the current subframe configuration and allocate uplink subframes in the determined subset together with one or more of the uplink subframes not belonging to any downlink HARQ process as the protected subframes for the terminal device, in response to the obtained type of interference being the uplink-dominant interference and the determined relationship indicating that the number of uplink subframes is larger than the number of downlink subframes; to determine a subset of uplink HARQ processes in the current subframe configuration and allocate downlink subframes in the determined subset together with one or more of the downlink subframes not belonging to any uplink HARQ process as the protected subframes for the terminal device, in response to the obtained type of interference being the downlink-dominant interference and the determined relationship indicating that the number of uplink subframes is smaller than the number of downlink subframes; or to determine a subset of the downlink HARQ processes and allocate all subframes in the determined subset together with one or more of the uplink subframes not belonging to any downlink HARQ process as the protected subframes for the terminal device if the determined relationship indicates that the number of uplink subframes is larger than the number of downlink subframes, or to determine a subset of the uplink HARQ processes and allocate all subframes in the determined subset together with one or more of the downlink subframes not belonging to any uplink HARQ process as the protected subframes for the terminal device if the determined relationship indicates that the number of uplink subframes is smaller than the number of downlink subframes, in response to the obtained type of interference being the bidirectional interference.

Supplementary Note 7

According to some embodiments of the present disclosure, there is provided a terminal device adapted for coordinating inter-cell interference in a heterogeneous network that comprises a macro cell and one or more small cells. The terminal device comprises a processor and a memory. The memory containing instructions executable by the processor whereby the terminal device is operative to receive scheduling information in relation to protected subframe allocation from a base station serving the terminal device; and in response to the scheduling information indicating transmission scheduling on each of allocated protected subframes, conduct transmission on that allocated protected subframe. The protected subframe allocation is performed according to a type of interference from the macro cell to the small cell and a relationship between a number of uplink subframes and a number of downlink subframes in a current subframe configuration used in the macro cell.

In one embodiment, the type of interference may comprise one of the following: uplink-dominant interference in which an impact of uplink interference from the macro cell on the small cell is more serious than an impact of downlink interference from the macro cell on the small cell; downlink-dominant interference in which the impact of the downlink interference on the small cell is more serious than the impact of the uplink interference on the small cell; and bidirectional interference in which the impact of the uplink interference on the small cell is equivalent to the impact of the downlink interference on the small cell.

In another embodiment, in a case where the type of interference is the uplink-dominant interference and the relationship indicates that the number of uplink subframes is larger than the number of downlink subframes, the protected subframes may comprise uplink subframes in a subset of DL HARQ processes in the current subframe configuration or alternatively comprise the uplink subframes in the subset and one or more uplink subframes not belonging to any DL HARQ process. In a case where the type of interference is the downlink-dominant interference and the determined relationship indicates that the number of uplink subframes is smaller than the number of downlink subframes, the protected subframes may comprise downlink subframes in a subset of uplink HARQ processes in the current subframe configuration or alternatively comprise downlink subframes in the subset and one or more of the downlink subframes not belonging to any uplink HARQ process. In a case where the type of interference is the bidirectional interference and the determined relationship indicates that the number of uplink subframes is larger than the number of downlink subframes, the protected subframes may comprise all subframes in a subset of the downlink HARQ processes or alternatively comprise all subframes in the subset and one or more of the uplink subframes not belonging to any downlink HARQ process. In a case where the type of interference is the bidirectional interference and the determined relationship indicates that the number of uplink subframes is smaller than the number of downlink subframes, the protected subframes may comprise all subframes in a subset of the uplink HARQ processes or alternatively comprise all subframes in the subset and one or more of the downlink subframes not belonging to any uplink HARQ process.

Supplementary Note 8

According to some embodiments of the present disclosure, there is provided an apparatus adapted for coordinating inter-cell interference in a heterogeneous network comprising a macro cell and at least one small cell. The apparatus comprises processing means adapted to obtain, with regard to a terminal device in a small cell, a type of interference from the macro cell to the small cell and determine a relationship between a number of uplink subframes and a number of downlink subframes in a current subframe configuration used in the macro cell. The processing means is also adapted to allocate protected subframes for the terminal device according to the obtained type of interference and the determined relationship. The processing means is further adapted to schedule transmission in relation to the allocated protected subframes in the macro cell.

In one embodiment, the type of interference may comprise one of the following: uplink-dominant interference in which an impact of uplink interference from the macro cell on the small cell is more serious than an impact of downlink interference from the macro cell on the small cell; downlink-dominant interference in which the impact of the downlink interference on the small cell is more serious than the impact of the uplink interference on the small cell; and bidirectional interference in which the impact of the uplink interference on the small cell is equivalent to the impact of the downlink interference on the small cell.

In another embodiment, the processing means may be adapted to determine a subset of DL HARQ processes in the current subframe configuration and to allocate uplink subframes in the determined subset, or uplink subframes in the determined subset together with one or more of the uplink subframes not belonging to any downlink HARQ process as the protected subframes for the terminal device, in response to the obtained type of interference being the uplink-dominant interference and the determined relationship indicating that the number of uplink subframes is larger than the number of downlink subframes. The processing means may also be adapted to determine a subset of uplink HARQ processes in the current subframe configuration and to allocate downlink subframes in the determined subset, or the downlink subframes in the determined subset together with one or more of the downlink subframes not belonging to any uplink HARQ process as the protected subframes for the terminal device, in response to the obtained type of interference being the downlink-dominant interference and the determined relationship indicating that the number of uplink subframes is smaller than the number of downlink subframes.

The processing means may further be adapted to determine a subset of the downlink HARQ processes and to allocate all subframes in the determined subset, or all subframes in the determined subset together with one or more of the uplink subframes not belonging to any downlink HARQ process as the protected subframes for the terminal device, in response to the obtained type of interference being the bidirectional interference and the determined relationship indicating that the number of uplink subframes is larger than the number of downlink subframes. The processing means may further be adapted to determine a subset of the uplink HARQ processes and to allocate all subframes in the determined subset, or all subframes in the determined subset together with one or more of the downlink subframes not belonging to any uplink HARQ process as the protected subframes for the terminal device, in response to the obtained type of interference being the bidirectional interference and the determined relationship indicating that the number of uplink subframes is smaller than the number of downlink subframes.

Supplementary Note 9

According to some embodiments of the present disclosure, there is provided a terminal device adapted for coordinating inter-cell interference in a heterogeneous network comprising a macro cell and at least one small cell. The terminal device comprises processing means. The processing means is adapted to receive scheduling information in relation to protected subframe allocation from a base station serving the terminal device; and in response to the scheduling information indicating transmission scheduling on each of allocated protected subframes, conduct transmission on that allocated protected subframe. The protected subframe allocation is performed according to a type of interference from the macro cell to the small cell and a relationship between a number of uplink subframes and a number of downlink subframes in a current subframe configuration used in the macro cell.

In one embodiment, the type of interference may comprise one of the following: uplink-dominant interference in which an impact of uplink interference from the macro cell on the small cell is more serious than an impact of downlink interference from the macro cell on the small cell; downlink-dominant interference in which the impact of the downlink interference on the small cell is more serious than the impact of the uplink interference on the small cell; and bidirectional interference in which the impact of the uplink interference on the small cell is equivalent to the impact of the downlink interference on the small cell.

In another embodiment, in a case where the type of interference is the uplink-dominant interference and the relationship indicates that the number of uplink subframes is larger than the number of downlink subframes, the protected subframes may comprise uplink subframes in a subset of DL HARQ processes in the current subframe configuration or alternatively comprise the uplink subframes in the subset and one or more uplink subframes not belonging to any DL HARQ process. In a case where the type of interference is the downlink-dominant interference and the determined relationship indicates that the number of uplink subframes is smaller than the number of downlink subframes, the protected subframes may comprise downlink subframes in a subset of uplink HARQ processes in the current subframe configuration or alternatively comprise the downlink subframes in the subset and one or more of the downlink subframes not belonging to any uplink HARQ process. In a case where the type of interference is the bidirectional interference and the determined relationship indicates that the number of uplink subframes is larger than the number of downlink subframes, the protected subframes may comprise all subframes in a subset of the downlink HARQ processes or alternatively comprise all subframes in the subset and one or more of the uplink subframes not belonging to any downlink HARQ process. In a case where the type of interference is the bidirectional interference and the determined relationship indicates that the number of uplink subframes is smaller than the number of downlink subframes, the protected subframes may comprise all subframes in a subset of the uplink HARQ processes or alternatively comprise all subframes in the subset and one or more of the downlink subframes not belonging to any uplink HARQ process.

By virtue of the above described aspects of the present disclosure, a terminal device in a small cell of a HetNet may be scheduled to conduct normal UL data transmission and/or DL data reception on the allocated protected subframes without interference or with acceptable interference. By providing appropriate resource allocation between the macro cell and small cell, the eICIC technology that involves the ABS pattern and CRE may be effectively utilized in a TDD system with a guarantee of both interference-free data transmission for the small cell and necessary service resources in the macro cell.

Each apparatus as proposed above may be embodied as the apparatus 1310 or 1320 as discussed with reference to FIG. 13, and therefore the processor, the memory, and the instructions could be equally embodied as the processor 1311 or 1321, memory 1312 or 1322 and program 1314 or 1324, respectively.

Each terminal device as proposed above could be embodied as the terminal device 1330 as discussed with reference to FIG. 13, and therefore the processor, the memory, and the instructions could be equally embodied as the processor 1331, memory 1332 and program 1334, respectively.

Further, according to different implementation manners, the present disclosure also provides a computer program, comprising instructions which, when executed on at least one processor, e.g., the processor 1212, cause the at least one processor to carry out the method according to any one of claims 1 to 5 as attached in the following claims.

Further, according to different implementation manners, the present disclosure also provides a computer program, comprising instructions which, when executed on at least one processor, e.g., the processor 1311, cause the at least one processor to carry out the method according to any one of claims 1 to 5 as attached in the following claims.

According to different implementation manners, the present disclosure also provides a computer program, comprising instructions which, when executed on at least one processor, e.g., the processor 1331, cause the at least one processor to carry out the method according to any one of claims 6 to 10 as attached in the following claims.

In addition, the present disclosure provides a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

Although the above embodiments of the present disclosure are described in a LTE TDD system, a person skilled in the art shall understand that they are also applicable to other TDD systems, such as a TD-SCDMA system. According to the embodiments of the present disclosure, methods 700-900 are described with reference to a HetNet comprising a macro cell and multiple small cells. However, based on the inventive concept and principle introduced above, methods 700-900 may be implemented in various ways and may be easily extended for a larger HetNet comprising more macro cells and more small cells. Therefore, the invention and its embodiments are not limited to the examples and embodiments described above and may vary associated with the scope of the claims.

The techniques described herein may be implemented by various means so that an apparatus implementing one or more functions of a corresponding apparatus described with an embodiment comprises not only prior art means, but also means for implementing the one or more functions of a corresponding apparatus described with an embodiment and it may comprise separate means for each separate function, or means may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods, apparatuses, i.e. systems. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It should also be noted that the above described embodiments are given for describing rather than limiting the disclosure, and it is to be understood that modifications and variations may be resorted to without departing from the spirit and scope of the disclosure as those skilled in the art readily understand. Such modifications and variations are considered to be associated with the scope of the disclosure and the appended claims. The protection scope of the disclosure is defined by the accompanying claims.

What is claimed is:

1. A method for coordinating inter-cell interference in a heterogeneous network comprising a macro cell and at least one small cell, the method comprising:
    obtaining, with regard to a terminal device in a small cell, a type of interference from the macro cell to the small cell;
    determining a relationship between a number of uplink subframes and a number of downlink subframes in a current subframe configuration used in the macro cell;
    allocating protected subframes for the terminal device according to the obtained type of interference and the determined relationship; and
    scheduling transmission in relation to the allocated protected subframes in the macro cell.

2. The method according to claim 1, wherein the type of interference comprises one of the following:
    uplink-dominant interference in which an impact of uplink interference from the macro cell on the small cell is more serious than an impact of downlink interference from the macro cell on the small cell;
    downlink-dominant interference in which the impact of the downlink interference on the small cell is more serious than the impact of the uplink interference on the small cell; and
    bidirectional interference in which the impact of the uplink interference on the small cell is equivalent to the impact of the downlink interference on the small cell.

3. The method according to claim 2, wherein said allocating protected subframes for the terminal device comprises:
    in response to the obtained type of interference being the uplink-dominant interference and the determined relationship indicating that the number of uplink subframes is larger than the number of downlink subframes, determining a subset of downlink Hybrid Automatic Repeat Request (HARQ) processes in the current subframe configuration and allocating uplink subframes in the determined subset as the protected subframes for the terminal device;

in response to the obtained type of interference being the downlink-dominant interference and the determined relationship indicating that the number of uplink subframes is smaller than the number of downlink subframes, determining a subset of uplink HARQ processes in the current subframe configuration and allocating downlink subframes in the determined subset as the protected subframes for the terminal device;

in response to the obtained type of interference being the bidirectional interference, and the determined relationship indicating that the number of uplink subframes is larger than the number of downlink subframes, determining a subset of the downlink HARQ processes and allocating all subframes in the determined subset as the protected subframes for the terminal device; and in response to the obtained type of interference bring the bidirectional interference, and the determined relationship indicating that the number of uplink subframes is smaller than the number of downlink subframes, determining a subset of the uplink HARQ processes and allocating all subframes in the determined subset as the protected subframes for the terminal device.

4. The method according to claim 2, wherein said allocating protected subframes for the terminal device comprises:

in response to the obtained type of interference being the uplink-dominant interference and the determined relationship indicating that the number of uplink subframes is larger than the number of downlink subframes, determining a subset of downlink Hybrid Automatic Repeat Request (HARQ) processes in the current subframe configuration and allocating the uplink subframes in the determined subset together with one or more of the uplink subframes not belonging to any downlink HARQ process as the protected subframes for the terminal device;

in response to the obtained type of interference being the downlink-dominant interference and the determined relationship indicating that the number of uplink subframes is smaller than the number of downlink subframes, determining a subset of uplink HARQ processes in the current subframe configuration and allocating the downlink subframes in the determined subset together with one or more of the downlink subframes not belonging to any uplink HARQ process as the protected subframes for the terminal device;

in response to the obtained type of interference being the bidirectional interference, and the determined relationship indicating that the number of uplink subframes is larger than the number of downlink subframes, determining a subset of the downlink HARQ processes and allocating all subframes in the determined subset together with one or more of the uplink subframes not belonging to any downlink HARQ process as the protected subframes for the terminal device; and in response to the obtained type of interference being the bidirectional interference, and the determined relationship indicating that the number of uplink subframes is smaller than the number of downlink subframes, determining a subset of the uplink HARQ processes and allocating all subframes in the determined subset together with one or more of the downlink subframes not belonging to any uplink HARQ process as the protected subframes for the terminal device.

5. The method according to claim 1, wherein determining the relationship between the number of uplink subframes and the number of downlink is based on predefined Time Division Duplex uplink-downlink configuration information.

6. A method in a terminal device for coordinating inter-cell interference in a heterogeneous network comprising a macro cell and at least one small cell, the method comprising:

receiving scheduling information in relation to protected subframe allocation from a base station serving the terminal device; and in response to the scheduling information indicating transmission scheduling on each of allocated protected subframes, conducting transmission on that allocated protected subframe, wherein the protected subframe allocation is performed according to a type of interference from the macro cell to the small cell and a relationship between a number of uplink subframes and a number of downlink subframes in a current subframe configuration used in the macro cell.

7. The method according to claim 6, wherein the type of interference comprises one of the following:

uplink-dominant interference in which an impact of uplink interference from the macro cell on the small cell is more serious than an impact of downlink interference from the macro cell on the small cell;

downlink-dominant interference in which the impact of the downlink interference on the small cell is more serious than the impact of the uplink interference on the small cell; and bidirectional interference in which the impact of the uplink interference on the small cell is equivalent to the impact of the downlink interference on the small cell.

8. The method according to claim 7, wherein said allocated protected subframes comprise:

uplink subframes in a subset of downlink Hybrid Automatic Repeat Request (HARQ) processes in the current subframe configuration, in a case where the type of interference is the uplink-dominant interference and the relationship indicates that the number of uplink subframes is larger than the number of downlink subframes;

downlink subframes in a subset of uplink HARQ processes in the current subframe configuration, in a case where the type of interference is the downlink-dominant interference and the relationship indicates that the number of uplink subframes is smaller than the number of downlink subframes;

all subframes in a subset of the downlink HARQ processes, in a case where the type of interference is the bidirectional interference and the relationship indicates that the number of uplink subframes is larger than the number of downlink subframes;

all subframes in a subset of the uplink HARQ processes, in a case where the type of interference is the bidirectional interference and the relationship indicates that the number of uplink subframes is smaller than the number of downlink subframes.

9. The method according to claim 7, wherein said protected subframes comprise:

uplink subframes in a subset of downlink Hybrid Automatic Repeat Request (HARQ) processes in the current subframe configuration and one or more of the uplink subframes not belonging to any downlink HARQ process, in a case where the type of interference is the uplink-dominant interference and the relationship indicates that the number of uplink subframes is larger than the number of downlink subframes;

downlink subframes in a subset of uplink HARQ processes in the current subframe configuration and one or more of the downlink subframes not belonging to any uplink HARQ process, in a case where the type of interference is the downlink-dominant interference and the relationship indicates that the number of uplink subframes is smaller than the number of downlink subframes;

all subframes in a subset of the downlink HARQ processes and one or more of the uplink subframes not belonging to any downlink HARQ process, in a case where the type of interference is the bidirectional interference and the relationship indicates that the number of uplink subframes is larger than the number of downlink subframes; or all subframes in a subset of the uplink HARQ processes and one or more of the downlink subframes not belonging to any uplink HARQ process, in a case where the type of interference is the bidirectional interference and the relationship indicates that the number of uplink subframes is smaller than the number of downlink subframes.

10. The method according to claim 6, wherein the relationship between the number of uplink subframes and the number of downlink is based on predefined Time Division Duplex uplink-downlink configuration information.

11. An apparatus adapted for coordinating inter-cell interference in a heterogeneous network comprising a macro cell and at least one small cell, the apparatus comprising:
a processor and a memory, the memory containing instructions, which when executed by the processor, cause the apparatus to:
obtain, with regard to a terminal device in a small cell, a type of interference from the macro cell to the small cell;
determine a relationship between a number of uplink subframes and a number of downlink subframes in a current subframe configuration used in the macro cell;
allocate protected subframes for the terminal device according to the obtained type of interference and the determined relationship; and
schedule a transmission in relation to the allocated protected subframes in the macro cell.

12. The apparatus according to claim 11, wherein the type of interference comprises one of the following:
uplink-dominant interference in which an impact of uplink interference from the macro cell on the small cell is more serious than an impact of downlink interference from the macro cell on the small cell;
downlink-dominant interference in which the impact of the downlink interference on the small cell is more serious than the impact of the uplink interference on the small cell; and
bidirectional interference in which the impact of the uplink interference on the small cell is equivalent to the impact of the downlink interference on the small cell.

13. The apparatus according to claim 12, wherein the instructions, when executed by the processor, further cause the apparatus to:
in response to the obtained type of interference being the uplink-dominant interference and the determined relationship indicating that the number of uplink subframes is larger than the number of downlink subframes, determine a subset of downlink Hybrid Automatic Repeat Request (HARQ) processes in the current subframe configuration and allocate uplink subframes in the determined subset as the protected subframes for the terminal device;
in response to the obtained type of interference being the downlink-dominant interference and the determined relationship indicating that the number of uplink subframes is smaller than the number of downlink subframes, determine a subset of uplink HARQ processes in the current subframe configuration and allocate downlink subframes in the determined subset as the protected subframes for the terminal device;
in response to the obtained type of interference being the bidirectional interference, and the determined relationship indicating that the number of uplink subframes is larger than the number of downlink subframes, determine a subset of the downlink HARQ processes and allocate all subframes in the determined subset as the protected subframes for the terminal device; and
in response to the obtained type of interference being the bidirectional interference, and the determined relationship indicating that the number of uplink subframes is smaller than the number of downlink subframes, determine a subset of the uplink HARQ processes and allocate all subframes in the determined subset as the protected subframes for the terminal device.

14. The apparatus according to claim 12, wherein the instructions, when executed by the processor, further cause the apparatus to:
in response to the obtained type of interference being the uplink-dominant interference and the determined relationship indicating that the number of uplink subframes is larger than the number of downlink subframes, determine a subset of downlink Hybrid Automatic Repeat Request (HARQ) processes in the current subframe configuration and allocate the uplink subframes in the determined subset together with one or more of the uplink subframes not belonging to any downlink HARQ process as the protected subframes for the terminal device;
in response to the obtained type of interference being the downlink-dominant interference and the determined relationship indicating that the number of uplink subframes is smaller than the number of downlink subframes, determine a subset of uplink HARQ processes in the current subframe configuration and allocate the downlink subframes in the determined subset together with one or more of the downlink subframes not belonging to any uplink HARQ process as the protected subframes for the terminal device;
in response to the obtained type of interference being the bidirectional interference, and the determined relationship indicating that the number of uplink subframes is larger than the number of downlink subframes, determine a subset of the downlink HARQ processes and allocate all subframes in the determined subset together with one or more of the uplink subframes not belonging to any downlink HARQ process as the protected subframes for the terminal device; and
in response to the obtained type of interference being the bidirectional interference, and the determined relationship indicates that the number of uplink subframes is smaller than the number of downlink subframes, determine a subset of the uplink HARQ processes and allocate all subframes in the determined subset together with one or more of the downlink subframes not belonging to any uplink HARQ process as the protected subframes for the terminal device.

15. A terminal device adapted for coordinating inter-cell interference in a heterogeneous network comprising a macro cell and at least one small cell, comprising:
a processor and a memory, the memory containing instructions, which when executed by the processor, cause the terminal device to:
receive scheduling information in relation to protected subframe allocation from a base station serving the terminal device and, in response to the scheduling information indicating downlink transmission scheduling on one or more of allocated subframes, conduct downlink reception on the one or more of the allocated protected subframes; and
in response to the scheduling information indicating uplink transmission scheduling on one or more of the allocated subframes, conduct uplink transmission on the one or more of the allocated protected subframes, wherein
the protected subframe allocation is performed according to a type of interference from the macro cell to the small cell and a relationship between a number of uplink subframes and a number of downlink subframes in a current subframe configuration used in the macro cell.

16. The terminal device according to claim 15, wherein the type of interference comprises one of the following:
uplink-dominant interference in which an impact of uplink interference from the macro cell on the small cell is more serious than an impact of downlink interference from the macro cell on the small cell;
downlink-dominant interference in which the impact of the downlink interference on the small cell is more serious than the impact of the uplink interference on the small cell; and
bidirectional interference in which the impact of the uplink interference on the small cell is equivalent to the impact of the downlink interference on the small cell.

17. The terminal device according to claim 16, wherein said allocated protected subframes comprise:
uplink subframes in a subset of downlink Hybrid Automatic Repeat Request (HARQ) processes in the current subframe configuration, in a case where the type of interference is the uplink-dominant interference and the relationship indicates that the number of uplink subframes is larger than the number of downlink subframes;
downlink subframes in a subset of uplink HARQ processes in the current subframe configuration, in a case where the type of interference is the downlink-dominant interference and the relationship indicates that the number of uplink subframes is smaller than the number of downlink subframes;
all subframes in a subset of the downlink HARQ processes, in a case where the type of interference is the bidirectional interference and the relationship indicates that the number of uplink subframes is larger than the number of downlink subframes; or
all subframes in a subset of the uplink HARQ processes, in a case where the type of interference is the bidirectional interference and the relationship indicates that the number of uplink subframes is smaller than the number of downlink subframes.

18. The terminal device according to claim 16, wherein said allocated protected subframes comprise:
uplink subframes in a subset of downlink Hybrid Automatic Repeat Request (HARQ) processes in the current subframe configuration and one or more of the uplink subframes not belonging to any downlink HARQ process, in a case where the type of interference is the uplink-dominant interference and the relationship indicates that the number of uplink subframes is larger than the number of downlink subframes;
downlink subframes in a subset of uplink HARQ processes in the current subframe configuration and one or more of the downlink subframes not belonging to any uplink HARQ process, in a case where the type of interference is the downlink-dominant interference and the relationship indicates that the number of uplink subframes is smaller than the number of downlink subframes;
all subframes in a subset of the downlink HARQ processes and one or more of the uplink subframes not belonging to any downlink HARQ process, in a case where the type of interference is the bidirectional interference and the relationship indicates that the number of uplink subframes is larger than the number of downlink subframes; or
all subframes in a subset of the uplink HARQ processes and one or more of the downlink subframes not belonging to any uplink HARQ process, in a case where the type of interference is the bidirectional interference and the relationship indicates that the number of uplink subframes is smaller than the number of downlink subframes.

19. A terminal device adapted for coordinating inter-cell interference in a heterogeneous network comprising a macro cell and at least one small cell, wherein Time Division Duplex (TDD) uplink-downlink configuration 0 is used, comprising:
a processor and a memory, the memory containing instructions, which when executed by the processor, cause the terminal device to:
receive scheduling information in relation to protected subframe allocation from a base station serving the terminal device and to, in response to the scheduling information indicating downlink transmission scheduling on one or more of allocated protected subframes, conduct downlink reception on the one or more of the allocated protected subframes; and
in response to the scheduling information indicating uplink transmission scheduling on one or more of the allocated protected subframes, conduct uplink transmission on the one or more of the allocated protected subframes, wherein
the allocated protected subframes comprise:
uplink subframes in a subset of four downlink Hybrid Automatic Repeat Request (HARQ) processes in the TDD uplink-downlink configuration 0,
uplink subframes in a subset of the four downlink HARQ processes and one or more uplink subframes not belonging to any of the four downlink HARQ processes,
all subframes in a subset of the four downlink HARQ processes, or
all subframes in a subset of the four downlink HARQ processes and one or more uplink subframes not belonging to any of the four downlink HARQ processes.

20. A terminal device adapted for coordinating inter-cell interference in a heterogeneous network comprising a macro cell and at least one small cell, wherein Time Division Duplex (TDD) uplink-downlink configuration 1 is used, comprising:
- a processor and a memory, the memory containing instructions, which when executed by the processor, cause the terminal device to:
  - receive scheduling information in relation to protected subframe allocation from a base station serving the terminal device and to, in response to the scheduling information indicating downlink transmission scheduling on one or more of allocated protected subframes, conduct downlink reception on the one or more of the allocated protected subframes; and
  - in response to the scheduling information indicating uplink transmission scheduling on one or more of the allocated protected subframes, conduct uplink transmission on the one or more of the allocated downlink protected subframes, wherein
    - the allocated protected subframes comprise:
      - downlink subframes in a subset of four uplink Hybrid Automatic Repeat Request (HARQ) processes in the TDD uplink-downlink configuration 1,
      - downlink subframes in a subset of the four uplink HARQ processes and one or more downlink subframes not belonging to any of the four uplink HARQ processes,
      - all subframes in a subset of the four uplink HARQ processes, or
      - all subframes in a subset of the four uplink HARQ processes and one or more downlink subframes not belonging to any of the four uplink HARQ processes.

21. A terminal device adapted for coordinating inter-cell interference in a heterogeneous network comprising a macro cell and at least one small cell, wherein Time Division Duplex (TDD) uplink-downlink configuration 2 is used, comprising:
- a processor and a memory, the memory containing instructions, which when executed by the processor, cause the terminal device to:
  - receive scheduling information in relation to protected subframe allocation from a base station serving the terminal device and to, in response to the scheduling information indicating downlink transmission scheduling on one or more of allocated protected subframes, conduct downlink reception on the one or more of the allocated protected subframes; and
  - in response to the scheduling information indicating uplink transmission scheduling on one or more of the allocated protected subframes, conduct uplink transmission on the one or more of the allocated downlink protected subframes, wherein
    - the allocated protected subframes comprise:
      - downlink subframes in either of two uplink Hybrid Automatic Repeat Request (HARQ) processes in the TDD uplink-downlink configuration 2,
      - downlink subframes in either of the two uplink HARQ processes and one or more downlink subframes not belonging to any of the two uplink HARQ processes,
      - all subframes in either of the two uplink HARQ processes, or
      - all subframes in either of the two uplink HARQ processes and one or more downlink subframes not belonging to any of the two uplink HARQ processes.

22. A terminal device adapted for coordinating inter-cell interference in a heterogeneous network comprising a macro cell and at least one small cell, comprising a processor and a memory, said memory containing instructions executable by said processor wherein said terminal device is operative to:
- receive scheduling information in relation to protected subframe allocation from a base station serving the terminal device; and
- in response to the scheduling information indicating transmission scheduling on each of allocated protected subframes, conduct transmission on that allocated protected subframe, wherein
- the protected subframe allocation is performed according to a type of interference from the macro cell to the small cell and a relationship between a number of uplink subframes and a number of downlink subframes in a current subframe configuration used in the macro cell.

23. An apparatus adapted for coordinating inter-cell interference in a heterogeneous network comprising a macro cell and at least one small cell, comprising processing means adapted to:
- obtain, with regard to a terminal device in a small cell, a type of interference from the macro cell to the small cell;
- determine a relationship between a number of uplink subframes and a number of downlink subframes in a current subframe configuration used in the macro cell;
- allocate protected subframes for the terminal device according to the obtained type of interference and the determined relationship; and
- schedule transmission in relation to the allocated protected subframes in the macro cell.

24. A terminal device adapted for coordinating inter-cell interference in a heterogeneous network comprising a macro cell and at least one small cell, comprising processing means adapted to:
- receive scheduling information in relation to protected subframe allocation from a base station serving the terminal device; and
- in response to the scheduling information indicating transmission scheduling on each of allocated protected subframes, conduct transmission on that allocated protected subframe, wherein
- the protected subframe allocation is performed according to a type of interference from the macro cell to the small cell and a relationship between a number of uplink subframes and a number of downlink subframes in a current subframe configuration used in the macro cell.

25. A non-transitory computer-readable storage medium having computer code stored therein, which when executed by a processor for coordinating inter-cell interference in a heterogeneous network comprising a macro cell and at least one small cell, cause the processor to perform operations comprising:
- obtaining, with regard to a terminal device in a small cell, a type of interference from the macro cell to the small cell;
- determining a relationship between a number of uplink subframes and a number of downlink subframes in a current subframe configuration used in the macro cell;

allocating protected subframes for the terminal device according to the obtained type of interference and the determined relationship; and scheduling transmission in relation to the allocated protected subframes in the macro cell.

26. A non-transitory computer-readable storage medium having computer code stored therein, which when executed by a processor of a terminal device for coordinating inter-cell interference in a heterogeneous network comprising a macro cell and at least one small cell, cause the terminal device to perform operations comprising:

receiving scheduling information in relation to protected subframe allocation from a base station serving the terminal device; and in response to the scheduling information indicating transmission scheduling on each of allocated protected subframes, conducting transmission on that allocated protected subframe, wherein the protected subframe allocation is performed according to a type of interference from the macro cell to the small cell and a relationship between a number of uplink subframes and a number of downlink subframes in a current configuration used in the macro cell.

* * * * *